United States Patent
Hirao et al.

(10) Patent No.: US 11,976,586 B2
(45) Date of Patent: May 7, 2024

(54) ENGINE

(71) Applicant: Yanmar Holdings Co., Ltd., Osaka (JP)

(72) Inventors: Yu Hirao, Osaka (JP); Shinya Matsuo, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/119,598

(22) Filed: Mar. 9, 2023

(65) Prior Publication Data

US 2023/0287828 A1 Sep. 14, 2023

(30) Foreign Application Priority Data

Mar. 10, 2022 (JP) ................................. 2022-036963
Mar. 10, 2022 (JP) ................................. 2022-036966

(51) Int. Cl.

| F02B 29/04 | (2006.01) |
|---|---|
| F01N 13/10 | (2010.01) |
| F02B 75/22 | (2006.01) |
| F02M 35/10 | (2006.01) |
| F02M 35/116 | (2006.01) |

(52) U.S. Cl.
CPC ........ *F02B 29/0437* (2013.01); *F01N 13/107* (2013.01); *F02B 29/0462* (2013.01); *F02B 75/22* (2013.01); *F02M 35/10157* (2013.01); *F02M 35/116* (2013.01)

(58) Field of Classification Search
CPC .. F02B 29/0462; F02B 29/0437; F02B 29/04; F02B 29/0443; F02B 75/22; F02B 37/002; F02B 37/007
See application file for complete search history.

(56) References Cited

U.S. PATENT DOCUMENTS

| 2005/0028515 A1* | 2/2005 | Fukuma | .............. F02D 41/0082 60/276 |
|---|---|---|---|
| 2012/0174576 A1* | 7/2012 | Vigild | ................. F02B 29/0475 60/599 |
| 2017/0198664 A1* | 7/2017 | Bramson | ................ F02M 26/35 |
| 2019/0310032 A1* | 10/2019 | Nishiyama | .............. F02B 29/04 |

FOREIGN PATENT DOCUMENTS

| DE | 112018003460 B4 * | 3/2022 | .......... F02B 29/0418 |
|---|---|---|---|
| DE | 102021125235 B3 * | 11/2022 | |
| EP | 0790393 A1 * | 8/1997 | |
| JP | 2009-228654 A | 10/2009 | |
| JP | 2019-100217 A | 6/2019 | |

\* cited by examiner

*Primary Examiner* — Ngoc T Nguyen
(74) *Attorney, Agent, or Firm* — NORTON ROSE FULBRIGHT US LLP

(57) ABSTRACT

An engine includes: two cylinder rows so placed as to be aligned side by side; a turbocharger; and an intercooler shared by the two cylinder rows, and connected to the turbocharger. The intercooler has: a cool liquid flow path through which a cool liquid flows, and an intake air flow path through which intake air from the turbocharger flows. The cool liquid flow path has an inlet and outlet of the cool liquid on one side in a first direction along the flow of the cool liquid. The intake air flow path has an inlet of the intake air on one side in a second direction along the flow of the intake air, and an outlet of the intake air on another side.

20 Claims, 14 Drawing Sheets

ENGINE

CROSS-REFERENCE TO RELATED APPLICATIONS

This application claims priority under 35 U.S.C. § 119 to JP Application No. 2022-036966 filed Mar. 10, 2022, and JP Application No. 2022-036963 filed Mar. 10, 2022, the entire contents of which are hereby incorporated by reference.

TECHNICAL FIELD

The present invention relates to an engine.

BACKGROUND ART

Conventionally, a V-type engine having an intercooler is known (see, for example, Patent Document 1). The V-type engine disclosed in Patent Document 1 has a pair of banks. Then, the intercooler is placed above the cylinder head of each of the banks. Further, a V-type engine provided with two cylinder rows is known (see, for example, Patent Document 2). In the V-type multi-cylinder engine disclosed in Patent Document 2, a single turbocharger is placed in an intra-bank space.

PRIOR ART DOCUMENT

Patent Document

Patent Document 1: Japanese Unexamined Patent Application Publication No. 2019-100217
Patent Document 2: Japanese Unexamined Patent Application Publication No. 2009-228654

SUMMARY OF INVENTION

Technical Problem

When it is so configured that an intercooler is installed for each of the pair of banks, there is a concern that, for example, an increase in the number of parts may result in higher cost or a larger engine size. Further, in the configuration of providing the intercooler for each of the pair of banks, a difference in the flowrate or velocity of a cool liquid can easily occur to between the two intercoolers, for example, resulting in a difference in cooling performance between the banks. Further, rather than providing only one turbocharger for the two cylinder rows, providing a turbocharger for each of the two cylinder rows, since being capable of improving the engine's response, etc., is advantageous. However, the intra-bank space is narrow, and it is not easy to place two turbochargers in the intra-bank space. Placing the two turbochargers outside of the intra-bank space causes a concern of enlarging the engine.

An object of the present invention is to provide a technology proper for an engine provided with two cylinder rows and an intercooler, and to provide the engine that can achieve both improved performance and compactness.

Solution to Problem

An exemplary engine of the present invention includes: two cylinder rows so placed as to be aligned side by side; a turbocharger; and an intercooler shared by the two cylinder rows, and connected to the turbocharger. The intercooler has: a cool liquid flow path through which a cool liquid flows, and an intake air flow path through which intake air from the turbocharger flows. The cool liquid flow path has an inlet and outlet of the cool liquid on one side in a first direction along the flow of the cool liquid. The intake air flow path has an inlet of the intake air on one side in a second direction along the flow of the intake air, and an outlet of the intake air on another side. Further, an exemplary engine of the present invention includes: two cylinder rows so placed as to be aligned side by side, and each extending in a crankshaft direction, an intercooler placed at one end side of the two cylinder rows in the crankshaft direction, two turbochargers provided for the two cylinder rows, respectively, and connected to the intercooler, and two exhaust manifolds provided for the two cylinder rows, respectively, and placed on an opposite side of an intra-bank area positioned between the two cylinder rows. Each of the two turbochargers is placed at least partly on an extended region on one side in the crankshaft direction of the corresponding one of the exhaust manifolds, or between the extended region and the intercooler.

Advantageous Effects of Invention

According to the exemplary present invention, the number of parts can be reduced in an engine provided with two cylinder rows and an intercooler. Further, the exemplary present invention can suppress a difference in the intercooler's regulating the temperature of the intake air from being caused between the two cylinder rows. Further, according to the exemplary present invention, it is possible to achieve both improved performance and compactness of the engine.

DESCRIPTION OF EMBODIMENTS

Figure 1:
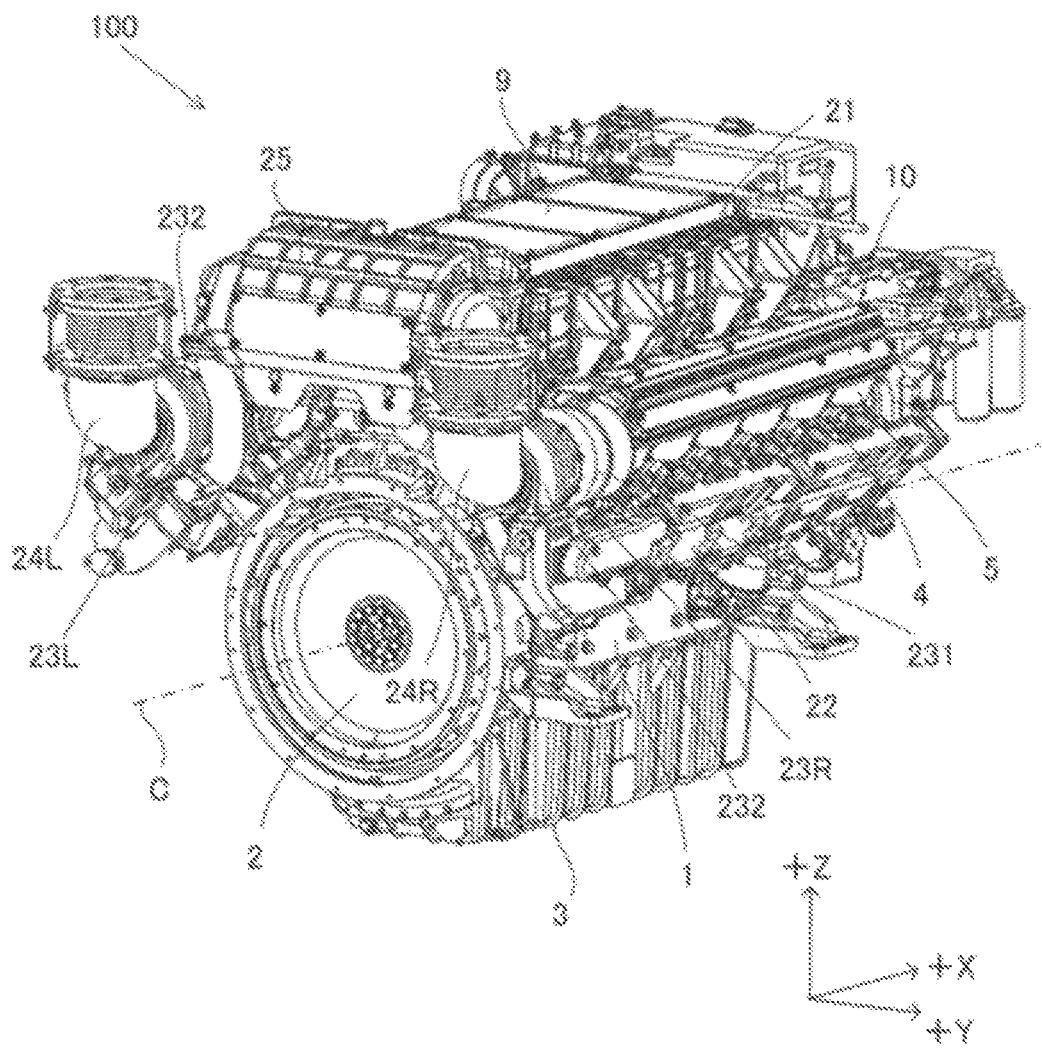
FIG. 1 is a schematic perspective view showing a configuration of an engine.

The following is a detailed description of an exemplary embodiment of the present invention with reference to the drawings. In the drawings, XYZ coordinate system is shown as the 3D Cartesian coordinate system, as appropriate. In the following description, X direction is defined as a front and back direction, Y direction is defined as a right and left direction, and Z direction is defined as an up and down direction. +X side is defined as a front side, and −X side is defined as a back side. +Y side is defined as a right side, and −Y side is defined as a left side. +Z side is defined as an up side, and −Z side is defined as a down side. In detail, the direction in which a center line C of a crankshaft (output shaft) shown in FIG. 1 extends is defined as the front and back direction, and the side where a flywheel 2 is placed relative to a cylinder block 1 is defined as the back side. The up and down direction is defined with the side, where an oil pan 3 is placed relative to the cylinder block 1, as the down side. The direction orthogonal to the front and back and up and down directions is defined as the right and left direction, with the right side being the right side and the left side being the left side when viewed from the back toward the front. These directions are names merely used for an illustrative purpose, and are not intended to limit the actual positional relation and direction. In the present specification, the crankshaft direction is the same as the front and back direction in which the center line C of the crankshaft extends.

<1. Overview of Engine>

FIG. 1 is a schematic perspective view showing a configuration of an engine 100 according to an embodiment of the present invention. The engine 100 is preferable, for example, as a marine engine used for a ship. However, the engine 100 is not limited to the marine engine, and may be applied to any other application. The engine 100 is a diesel engine.

Figure 2:
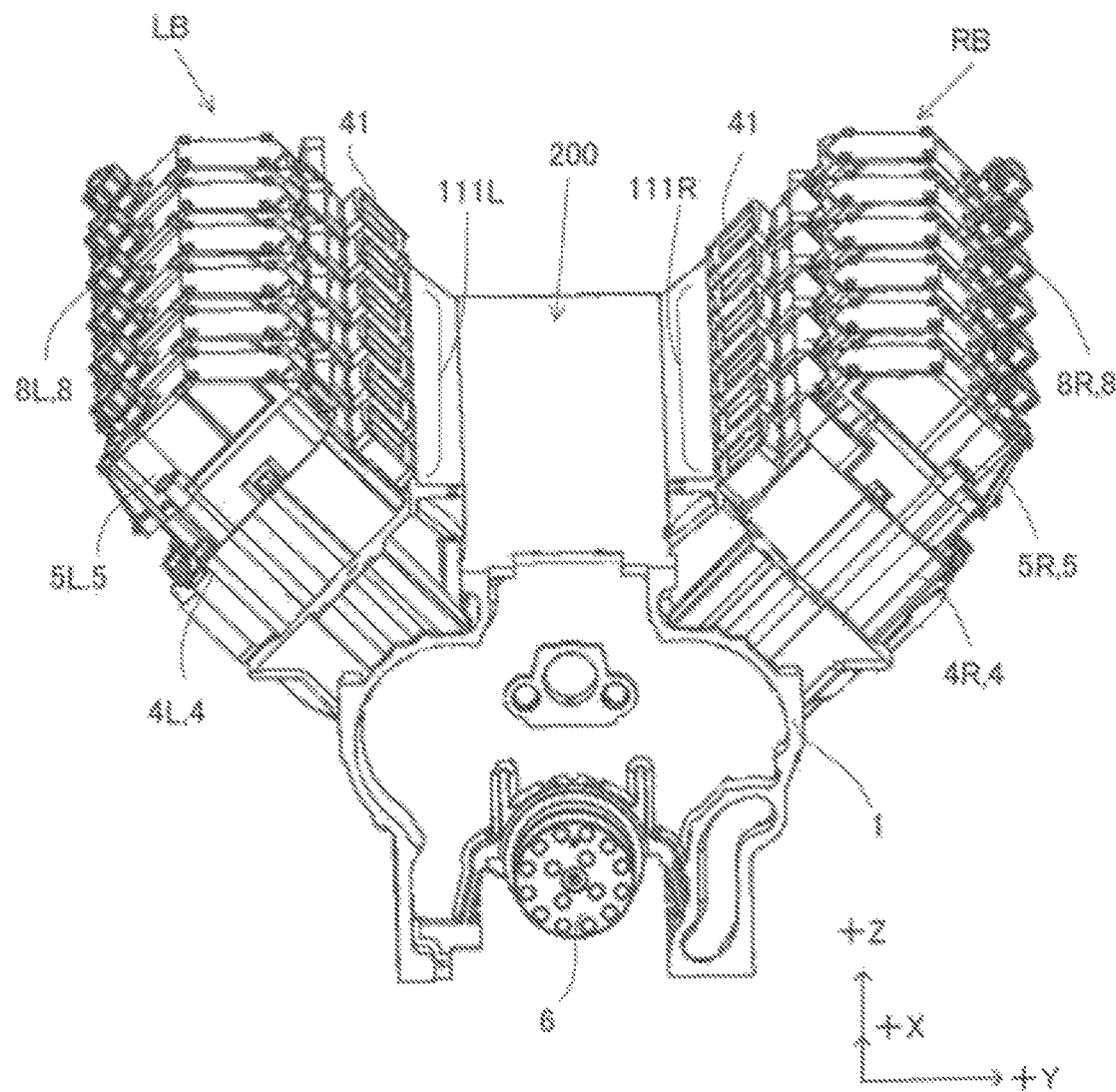
FIG. 2 is a schematic perspective view showing an extracted portion including a cylinder block, a head block, and a head cover which are provided in the engine.
Figure 3:
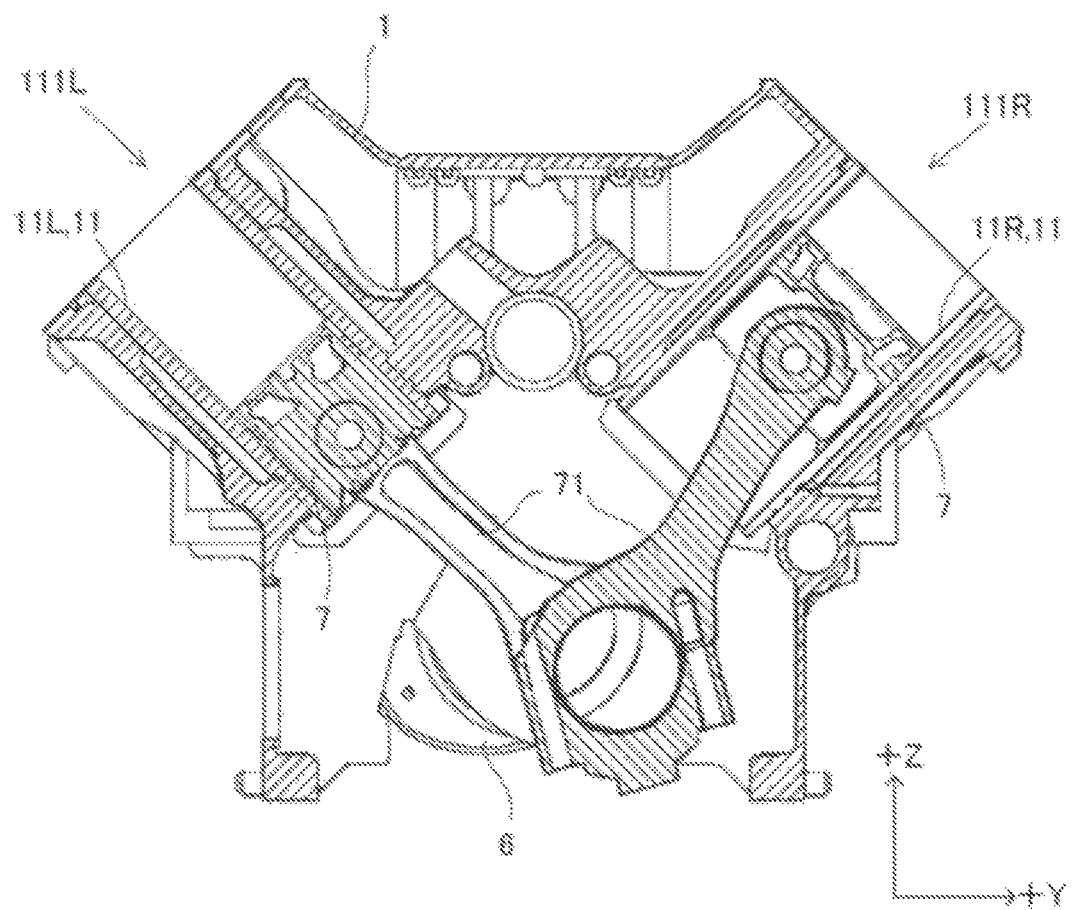
FIG. 3 is a schematic cross-sectional view of a cylinder block portion provided in the engine.

As shown in FIG. 1, the engine 100 includes a cylinder block 1, a head block 4, and a head cover 5. FIG. 2 is a schematic perspective view showing extracted a portion including the cylinder block 1, the head block 4, and the head cover 5 which are provided in the engine 100. FIG. 3 shows a schematic cross-sectional view of the cylinder block 1 portion of the engine 100.

As shown in FIGS. 2 and 3, a crankshaft 6, which extends in the front and back direction, and a piston 7 are placed inside the cylinder block 1. The inner portion of the cylinder block 1 connects to the inner portion of the oil pan 3 which is placed at the down side and stores a lubricant oil. A flywheel 2 (see FIG. 1) is mounted to the back end of the crankshaft 6. The flywheel 2 rotates integrally with the crankshaft 6, and is used to take out power from the engine 100. The piston 7, in detail, is placed in the cylinder 11 formed in the cylinder block 1. The piston 7 is connected to the crankshaft 6 via a connecting rod 71.

In detail, the cylinder block 1 has a right cylinder 11R placed on the right side and a left cylinder 11L placed on the left side. The right cylinder 11R, when viewed from behind, is of a cylindrical shape which is tilted to the right relative to the up and down direction and extends in an oblique direction. The left cylinder 11L, when viewed from behind, is of a cylindrical shape which is tilted to the left relative to the up and down direction and extends in an oblique direction. The right cylinder 11R and the left cylinder 11L are placed in a V-shape. The pairwise right cylinder 11R and left cylinder 11L which are placed in the V-shape are placed with their cylinder axes slightly offset in the front and back direction. In the present embodiment, the left cylinder 11L is placed slightly forward of the right cylinder 11R.

The cylinder block 1 has a right cylinder row 111R with the multiple right cylinders 11R arranged in the front and back direction, and a left cylinder row 111L with the multiple left cylinders 11L arranged in the front and back direction. That is, the engine 100 has two cylinder rows 111R and 111L. Each of the two cylinder rows 111R and 111L extends a row in the direction of the crankshaft. The two cylinder rows 111R and 111L are so placed as to be aligned side by side. Further, the two cylinder rows 111R and 111L are arranged in the right and left direction in detail. The right cylinder row 111R and the left cylinder row 111L form a V-shaped bank. In the present embodiment, the number of right cylinders 11R included in the right cylinder row 111R and the number of left cylinders 11L included in the left cylinder row 111L are each six, as an example. That is, the engine 100 in the present embodiment is a V-type 12-cylinder engine.

In each of the right and left cylinder rows 111R and 111L, the head block 4 is placed overlapping each cylinder 11. The head block 4 is fastened to the cylinder block 1 by using a screw. In detail, the head block 4 includes a right head block 4R that overlaps the right cylinder 11R and a left head block 4L that overlaps the left cylinder 11L. Because one right head block 4R overlaps each right cylinder 11R, there are as many right head blocks 4R as there are right cylinders 11R. Because one left head block 4L is overlaps each left cylinder 11L, there are as many left head blocks 4L as there are left cylinders 11L. In the present embodiment, the number of right head blocks 4R and the number of left head blocks 4L are each six.

Each of the head blocks 4 has an intake port 41 to supply gas to a combustion chamber including the cylinder 11, the piston 7, and the head block 4, and an exhaust port (not shown) to exhaust the gas from the combustion chamber. Further, the exhaust port is provided on the opposite face of the face where the intake port 41 is provided. In detail, the right head block 4R has the intake port 41 on the left lateral face and the exhaust port on the right lateral face. The left head block 4L has the intake port 41 on the right lateral face and the exhaust port on the left lateral face.

Each head block 4 is covered with the head cover 5. The head cover 5 is fastened to the head block 4 by using a screw. Each head cover 5 covers Intake and Exhaust valves (not shown) placed at the head block 4. An injector 8 is mounted on each head cover 5. The injector 8's one end portion, where an injection port for injecting a fuel is provided, faces the combustion chamber. The injector 8's another end portion projects outward from the head cover 5.

In detail, the head cover 5 includes a right head cover 5R that covers the right head block 4R and a left head cover 5L that covers the left head block 4L. The right head covers 5R, due to covering the respective right head blocks 4R, are the same in number as the right head blocks 4R. The left head covers 5L, due to covering the respective left head blocks 4L, are the same in number as the left head blocks 4L. In the present embodiment, the number of right head cover 5R and the number of left head cover 5L are each six. Also, the number of right injectors 8R placed at the right head cover 5R and the number of left injectors 8L placed at the left head cover 5L are each six.

On the right side of cylinder block 1, the right cylinder 11R, the right head block 4R and the right head cover 5R, which are included in a right bank RB, extend diagonally upward to the right. On the left side of cylinder block 1, the left cylinder 11L, the left head block 4L, and the left head cover 5L, which are included in a left bank LB, extend diagonally upward to the left. In plan view from the front and back direction, a combination of the right bank RB and the left bank LB is V-shaped, and the engine 100 has a V-bank. An intra-bank area 200 is formed between the right bank RB and the left bank LB in the right and left direction.

Returning to FIG. 1, the engine 100 has an upper face cover 9 and a lateral face cover 10. The upper face cover 9 suppresses water from splashing, due to condensation, for example, onto a controller 26 (see FIG. 4, etc., below) and the like placed inside. The lateral face cover 10 suppresses the fuel from splashing due to a crack, etc. in a component part such as the head block 4, for example. Although FIG. 1 shows only the lateral face cover 10 placed on the right lateral face, a similar lateral face cover 10 is also placed on the left lateral face. That is, the engine 100 is provided with a pair of right and left lateral face covers 10.

Figure 4:
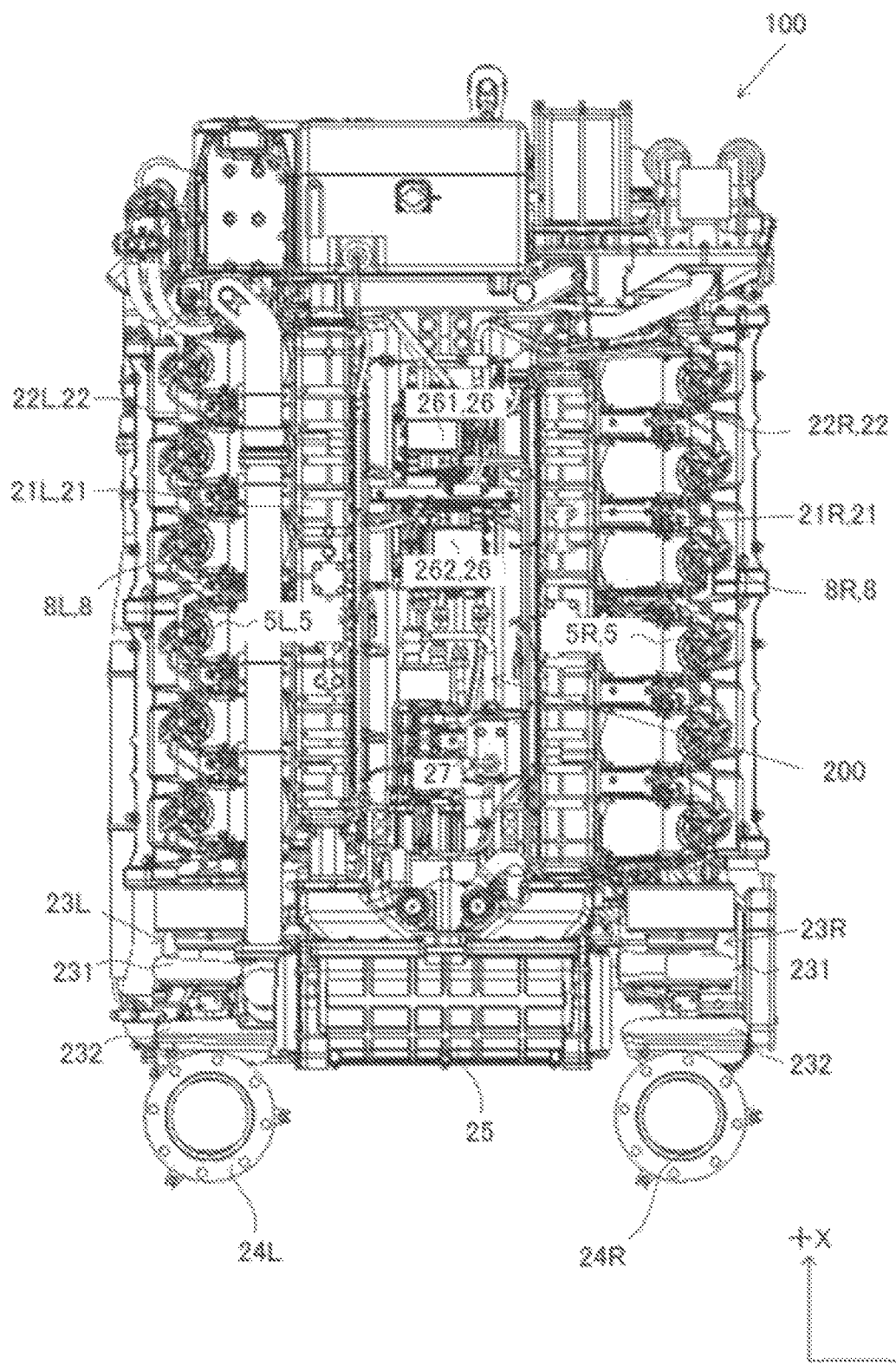
FIG. 4 is a schematic top view showing the configuration of the engine.

FIG. 4 is a schematic top view showing the configuration of the engine 100 according to the embodiment of the present invention. In FIG. 4, the upper face cover 9 and the pair of lateral face covers 10 are omitted. As shown in FIGS. 1 and 4, the engine 100 includes an intake manifold 21 and an exhaust manifold 22.

To each of the cylinders 11, the intake manifold 21 distributes intake air which is air or mixture air taken in from the outside. The intake manifold 21 is placed at an upper portion of the engine 100, and extends in the front and back direction. In detail, the intake manifold 21 includes a right intake manifold 21R for the right cylinder 11R, and a left intake manifold 21L for the left cylinder 11L. That is, the engine 100 has two intake manifolds 21R and 21L.

The right intake manifold 21R is placed above the respective intake ports 41 (see FIG. 2) of the multiple right head blocks 4R which are arranged in the front and back direction. The inner portion of the right intake manifold 21R and the respective right cylinders 11R are connected via the respective intake ports 41. The left intake manifold 21L is placed above the respective intake ports 41 of the multiple left head blocks 4L which are arranged in the front and back direction. The inner portion of the left intake manifold 21L and the respective left cylinders 11L are connected via the respective intake ports 41.

In detail, an intake valve (not shown) is interposed between each intake port 41 and each cylinder 11; when the intake valve is open, the inner portion of intake manifold 21 and cylinder 11 are communicated.

The exhaust manifold 22 collects the exhaust air from the respective cylinders 11. The exhaust manifold 22 is placed at the lateral face portion of the engine 100, and extends in the front and back direction. In detail, the exhaust manifold 22 includes a right exhaust manifold 22R for the right cylinder 11R, and a left exhaust manifold 22L for the left cylinder 11L.

The right exhaust manifold 22R is placed on the right side of the multiple right head blocks 4R (see FIG. 2) which are arranged in the front and back direction. The inner portion of the right exhaust manifold 22R and the respective right cylinders 11R are connected via exhaust ports (not shown) provided on the right side of the right head blocks 4R. The left exhaust manifold 22L is placed on the left side of the multiple left head blocks 4L (see FIG. 2) which are arranged in the front and back direction. The inner portion of the left exhaust manifold 22L and the respective left cylinders 11L are connected via the exhaust ports (not shown) provided on the left side of the left head blocks 4L.

In detail, an exhaust valve (not shown) is interposed between each exhaust port and each cylinder 11; when the exhaust valve is open, the inner portion of the exhaust manifold 22 and the cylinder 11 are communicated.

The exhaust gas collected at the right exhaust manifold 22R is exhausted to the outside via the right turbocharger 23R and the right exhaust outlet pipe 24R which are each placed at the right back of the engine 100. The exhaust gas collected at the left exhaust manifold 22L is exhausted to the outside via the left turbocharger 23L and the left exhaust outlet pipe 24L which are each placed at the left back of the engine 100. That is, the engine 100 is provided with a turbocharger 23.

The right turbocharger 23R and the left turbocharger 23L each have a compressor unit 231 and a turbine unit 232. The compressor unit 231 pressurizes and compresses intake air such as air supplied from outside the engine 100. The pressurized and compressed intake air is supplied via an intercooler 25 to the intake manifold 21. The turbine unit 232 is rotated by the exhaust gas supplied from the exhaust manifold 22. The rotary power of the turbine unit 232 is transmitted to the compressor unit 231. That is, the right turbocharger 23R and left turbocharger 23L in the present embodiment are so-called turbochargers that are driven by an exhaust gas turbine.

The intercooler 25, which is connected with the intake manifold 21, is supplied with cool water by a cool water pump (not shown), thereby to cool the intake air. The intake air supplied from the compressor unit 231 is pressurized and compressed, thereby to generate a compression heat and to be increased in temperature. The intercooler 25 performs heat exchange between the cool water, which is supplied by the cool water pump, and the pressurized compressed intake air, thereby to cool the intake air. That is, providing the intercooler 25 allows the temperature of the intake air, which is supplied to the intake manifold 21, to be adjusted to a desired temperature.

As shown in FIG. 4, the right intake manifold 21R and the left intake manifold 21L are spaced apart and arranged in the right and left direction at the upper portion of the engine 100. As shown in FIG. 4, with the upper face cover 9 removed, the intra-bank area 200 is exposed to the outside via a space between the right intake manifold 21R and the left intake manifold 21L. In the intra-bank area 200, there are placed, for example, the controller 26 that controls the entire engine 100, and a fuel pump 27 that supplies the fuel to the injector 8.

That is, the engine 100 includes the controller 26 placed in the intra-bank area 200 positioned between the right and left cylinder rows 111R and 111L. Also, the engine 100 includes the fuel pump 27 placed in the intra-bank area 200. The intra-bank area 200 may be, in a strict sense, a space area between the right and left cylinder rows 111R and 111L. In the present embodiment, however, the intra-bank area 200 widely includes the space area in the right and left direction between the right bank RB which includes the right cylinder row 111R, and the left bank LB which includes the left cylinder row 111L.

Creating the configuration to place the controller 26 and the fuel pump 27 in the intra-bank area 200 can efficiently use the intra-bank area 200 for placing the component part. This makes it possible to downsize the engine 100. However, the controller 26 and the fuel pump 27 may be placed outside of the intra-bank area 200.

Further, the controller 26 includes, in detail, a first controller 261 and a second controller 262. However, the number of controllers 26 may be changed as needed; for example, the controller 26 may include only one controller. In the present embodiment, the first controller 261 and the second controller 262 are arranged in the front and back direction (crankshaft direction). In detail, the first controller 261 is placed forward of the second controller 262. Any one of the first controller 261 and the second controller 262 is a main controller and another thereof is a sub-controller. In the present embodiment, the first controller 261 is the main controller, and the second controller 262 is the sub-controller.

The first controller 261 configured as the main controller executes a calculation necessary to control the engine 100. The calculations required to control the engine 100 include, for example, a calculation related to the control of fuel injection and a calculation related to stopping the engine 100. The second controller 262 which is configured as the sub-controller is connected with the first controller 261 by a communication line (not shown), and is so provided as to be capable of communicating with the first controller 261. The second controller 262 executes a control operation according to an instruction from the first controller 261.

The first controller 261 controls the right injector 8R placed at the right bank RB. That is, the first controller 261 and each right injector 8R are electrically connected. Further, the second controller 262 controls the left injector 8L placed at the left bank LB. That is, the second controller 262 and each left injector 8L are electrically connected.

Further, the fuel pump 27 discharges the fuel, which is at a high pressure, toward a high pressure fuel pipe (not shown) for the right bank RB and a high pressure fuel pipe (not shown) for the left bank LB. The fuel passing through the high-pressure fuel pipe for the right bank RB is distributed to each of the right injectors 8R placed at the right bank RB. The fuel passing through the high-pressure fuel pipe for the left bank LB is distributed to each of the left injectors 8L placed at the left bank LB. Under control by the controller 26, each of the injectors 8 injects the fuel to the combustion chamber.

<2. Details of Arrangement of Intake and Exhaust System Components>

Figure 5:
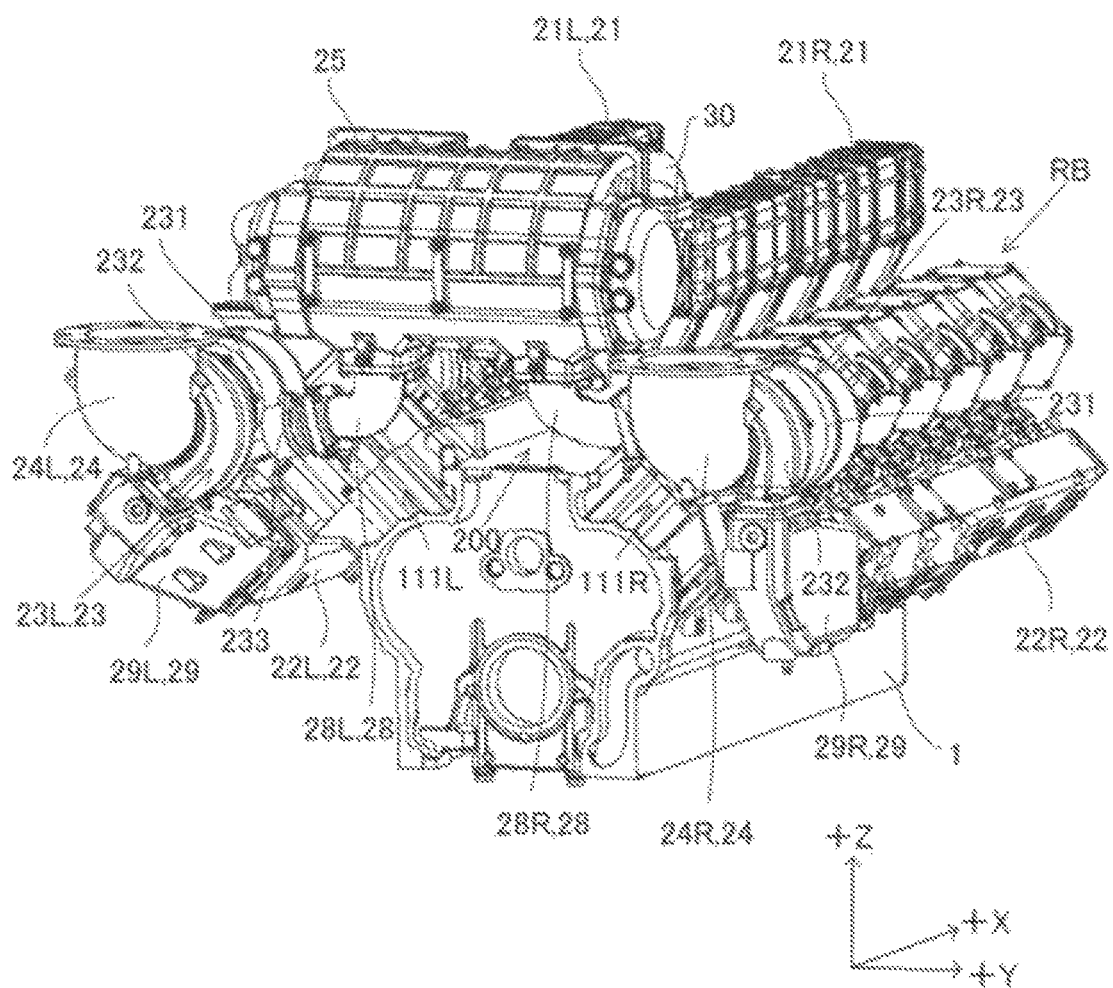
FIG. 5 is a schematic perspective view showing extracted parts included in an intake and exhaust system of the engine.

FIG. 5 is a schematic perspective view showing extracted parts included in the intake and exhaust system of the engine 100. As shown in FIG. 5, the components of the intake system of the engine 100 include the right and left turbochargers 23, the right and left first intake communication pipes 28, the intercooler 25, and the right and left intake manifolds 21.

Further, a right first intake communication pipe 28R connects the compressor unit 231 of the right turbocharger 23R with the intercooler 25. Intake air supplied from the compressor unit 231 of the right turbocharger 23R enters the intercooler 25 via the right first intake communication pipe 28R. The left first intake communication pipe 28L connects the compressor unit 231 of the left turbocharger 23L with the intercooler 25. Intake air supplied from the compressor unit 231 of the left turbocharger 23L enters the intercooler 25 via the left first intake communication pipe 28L. In detail, the right first intake communication pipe 28R and the left first intake communication pipe 28L are connected to separate positions in the intercooler 25.

The components of the exhaust system of the engine 100 include the right and left exhaust manifolds 22, the right and left exhaust communication pipes 29, the right and left turbochargers 23, and the right and left exhaust outlet pipes 24. Further, the right exhaust communication pipe 29R connects the rear end of the right exhaust manifold 22R with the turbine unit 232 of the right turbocharger 23R. Exhaust gas passing through in the right exhaust manifold 22R enters the turbine unit 232 of the right turbocharger 23R via the right exhaust communication pipe 29R. The left exhaust communication pipe 29L connects the rear end of the left exhaust manifold 22L with the turbine unit 232 of the left turbocharger 23L. Exhaust gas passing through in the left exhaust manifold 22L enters the turbine unit 232 of the left turbocharger 23L via the left exhaust communication pipe 29L.

Figure 6:
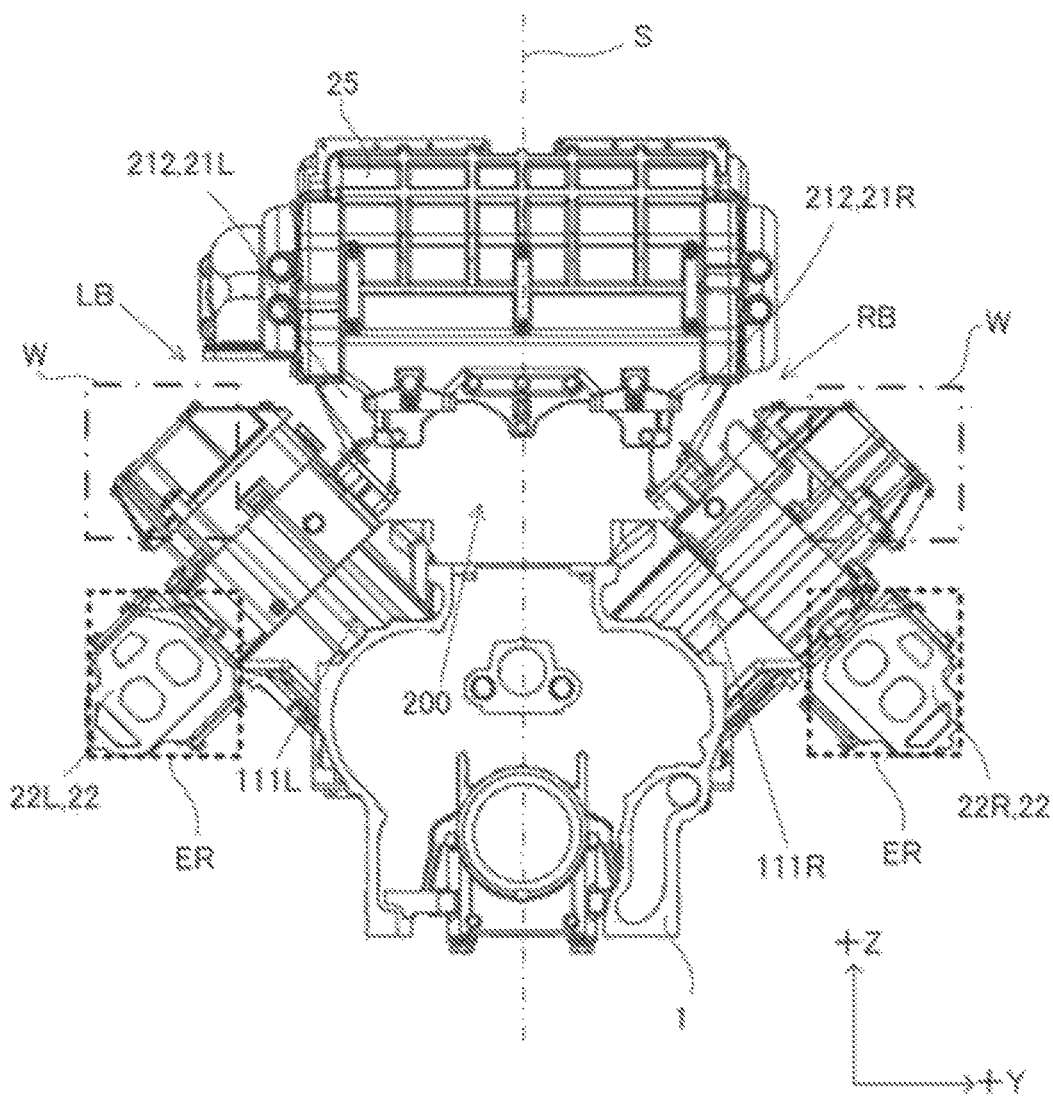
FIG. 6 is a schematic plan view from the rear, with the turbocharger and some parts around the turbocharger removed from the diagram shown in FIG. 5.
Figure 7:
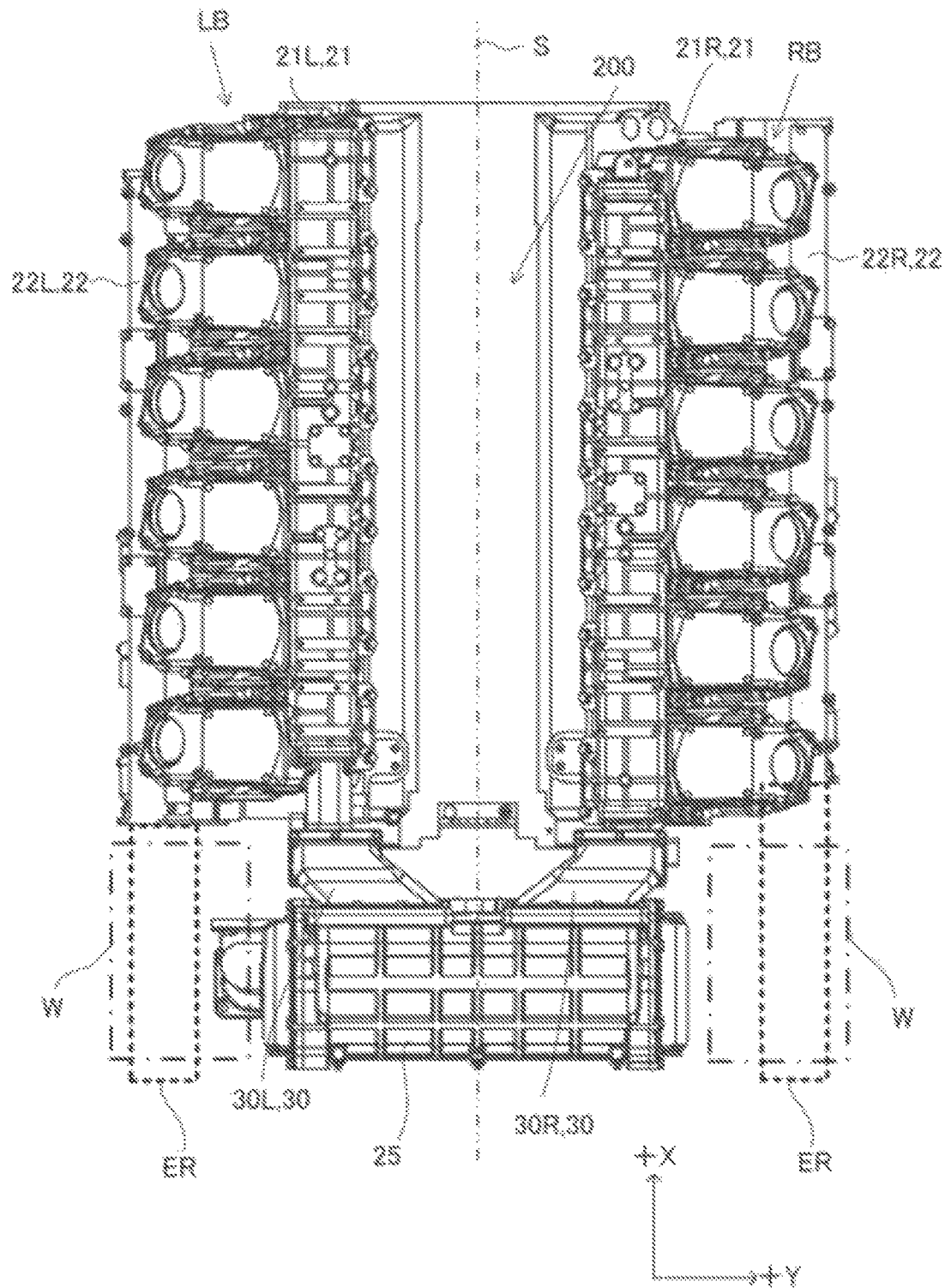
FIG. 7 is a schematic plan view from the above, with the turbocharger and some parts around the turbocharger removed from the diagram shown in FIG. 5.
Figure 8:
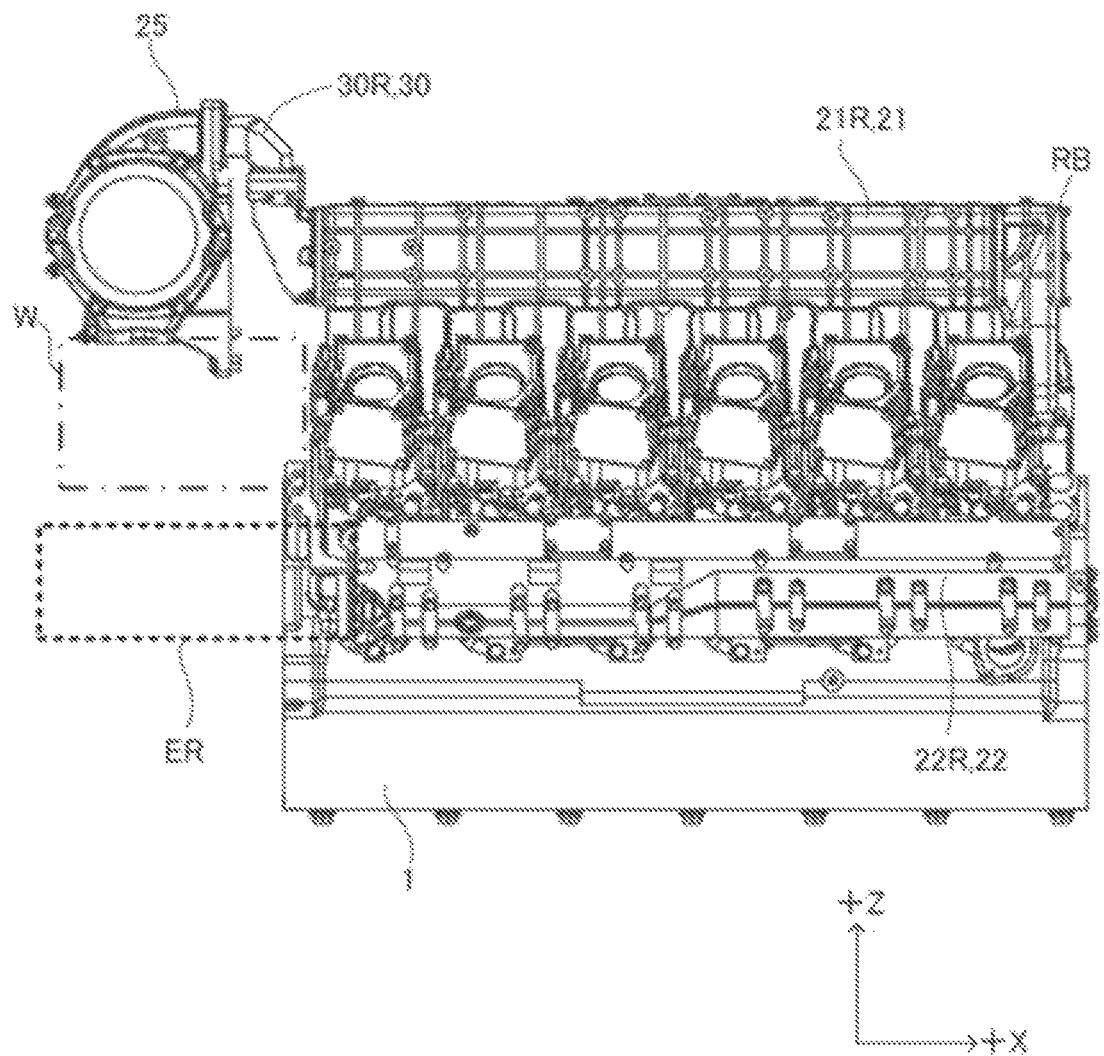
FIG. 8 is a schematic plan view from the right side, with the turbocharger and some parts around the turbocharger removed from the diagram shown in FIG. 5.

FIG. 6 is a schematic plan view from the rear, with the turbocharger 23 and some parts around the turbocharger 23 removed from the diagram shown in FIG. 5. FIG. 7 is a schematic plan view from the above, with the turbocharger 23 and some parts around the turbocharger 23 removed from the diagram shown in FIG. 5. FIG. 8 is a schematic plan view from the right side, with the turbocharger 23 and some parts around the turbocharger 23 removed from the diagram shown in FIG. 5. Further, some parts around the turbocharger 23 are pipes connected to the turbocharger 23. Pipes include the first intake communication pipe 28, the exhaust communication pipe 29, and the exhaust outlet pipe 24 which are described above.

In FIGS. 6, 7, and 8, a rectangular frame W shown in a single dotted line indicates the approximate position where the right and left turbochargers 23 are placed. The double-dotted line S shown in FIGS. 6 and 7 represents a plane that includes the center line C of the crankshaft 6 and is orthogonal to the right and left direction. Hereafter, this surface S is simply expressed as the center surface S. In FIGS. 6, 7, and 8, a region ER enclosed by the broken line is an extended region extending rearward from an area of the exhaust manifold 22. The extended region ER is a region that coincides with the region of the exhaust manifold 22 in plan view from the crankshaft direction and extends rearward from the exhaust manifold 22. Further, the shape of the extended region ER shown in FIGS. 6, 7, and 8 is not an exact shape, but a simplified shape.

As shown in FIGS. 5 to 8, the two exhaust manifolds 22R and 22L provided in the engine 100 are provided for the two cylinder rows, respectively 111R and 111L, and are placed on the opposite side of the intra-bank area 200 positioned between the two cylinder rows 111R and 111L. As described above, the right cylinder row 111R constitutes the right bank RB, and the left cylinder row 111L constitutes the left bank LB (see FIG. 2). In other words, the engine 100 is provided with exhaust manifolds 22R and 22L that are placed on the cylinder rows 111R and 111L's side opposite to the intra-bank area 200. The side opposite to the intra-bank area 200 is the side opposite to the side facing the intra-bank area 200.

In detail, the right exhaust manifold 22R, to the right cylinder row 111R, is placed on the engine 100's right lateral face which is the side opposite to the side facing the intra-bank area 200. More in detail, the right exhaust manifold 22R is mounted to of the multiple right head blocks 4R (see FIG. 2) included in the right bank RB. The left exhaust manifold 22L, to the left cylinder row 111L, is placed on the engine 100's left lateral face which is the side opposite to the side facing the intra-bank area 200. More in detail, the left exhaust manifold 22L is mounted to of the multiple left head blocks 4L (see FIG. 2) included in the left bank LB.

The right exhaust manifold 22R and the left exhaust manifold 22L are placed substantially symmetrically with respect to the center surface S. The right exhaust manifold 22R and the left exhaust manifold 22L have the same height position in the up and down direction (see FIG. 6). The right exhaust manifold 22R and the left exhaust manifold 22L are slightly offset from each other in the front and back direction. In detail, the left exhaust manifold 22L is placed slightly further back, relative to the right exhaust manifold 22R (see FIG. 7).

The right exhaust communication pipe 29R is placed behind the right exhaust manifold 22R. In other words, the right exhaust communication pipe 29R is at least partly placed in the extended region ER of the right exhaust manifold 22R. The left exhaust communication pipe 29L is placed behind the left exhaust manifold 22L. That is, the left exhaust communication pipe 29L is at least partly placed in the extended region ER of the left exhaust manifold 22L.

The intercooler 25 provided in the engine 100 is placed on one side in the crankshaft direction rather than the two cylinder rows 111R and 111L. In other words, the intercooler 25 is placed at one end side of the two cylinder rows 111R and 111L in the crankshaft direction. In detail, the intercooler is placed behind the two cylinder rows 111R and 111L (see FIG. 2). The intercooler 25 is placed outside of the intra-bank area 200. The intercooler 25 is placed above the two exhaust manifolds 22R and 22L. In other words, the intercooler 25 is placed above the extended regions ER of the two exhaust manifolds 22R and 22L (see FIG. 8).

The two turbochargers 23R and 23L provided in the engine 100 are provided for the two cylinder rows, respectively 111R and 111L. That is, the turbocharger 23, one in number, is provided for each of the two cylinder rows 111R and 111L. The two turbochargers 23R and 23L are connected with the intercooler 25. Further, each of the two turbochargers 23R and 23L may be directly connected to the intercooler 25, but in the present embodiment, however, as a preferred mode, is indirectly connected to the intercooler 25 via the first intake communication pipe 28. Each of the two turbochargers 23R, 23L is at least partially placed on the extended region ER on one side in the crankshaft direction of the corresponding one of the exhaust manifolds 22R, 22L, or between the extended region ER and the intercooler 25.

With the above configuration, the exhaust can be led by a short distance from each of the two exhaust manifolds 22R and 22L to the turbine unit 232 of one of the respective turbochargers 23R and 23L. Further, the intake air can be led by a short distance from each of the two turbochargers 23R and 23L to the intercooler 25. That is, creating the configuration provided with two turbochargers 23R and 23L, while improving the performance of the engine 100, allows the engine 100 to be made more compact.

In the present embodiment, each of the two turbochargers 23R, 23L is at least partly placed in the space between the extended region ER of one of the exhaust manifolds 22R, 22L and the intercooler 25, as shown by the broken line frame W in FIGS. 6, 7, and 8. The two turbochargers 23R and 23L are placed symmetrically with respect to the center surface S.

Each of the two turbochargers 23R, 23L, in the side view from the right and left direction, is at least partly placed between the extended regions ER of one of the exhaust manifolds 22R, 22L and the intercooler 25 in the up and down direction (see FIG. 8, for example). In detail, the right turbocharger 23R is placed at least partly above the right exhaust communication pipe 29R which is placed behind the right exhaust manifold 22R. Further, the left turbocharger 23L is at least partly placed above the left exhaust communication pipe 29L which is placed behind the left exhaust manifold 22L.

Further, it is preferable that the rear end of each of the two turbochargers 23R and 23L, in plan view from above, is prevented, as much as possible, from protruding rearward, compared to the rear end of the intercooler 25. It is preferable that, when protruding rearward, the protrusion amount should be less than half the length of each of the turbochargers 23R and 23L in the front and back direction. It is more preferable that the position of the rear end of each of the two turbochargers 23R and 23L, in the front and back direction, in plan view from above, is either same as or forward of the rear end of the intercooler 25.

In the present embodiment, each of the two turbochargers 23R and 23L, in plan view from the crankshaft direction, is placed outside of the intra-bank area 200. As shown in FIG. 6, the right turbocharger 23R, in plan view from the crankshaft direction, is placed to the right of the intra-bank area 200. The left turbocharger 23L, in plan view from the crankshaft direction, is placed to the left of the intra-bank area 200.

The right exhaust outlet pipe 24R is placed behind the turbine unit 232 of the right turbocharger 23R (see FIG. 5). The left exhaust outlet pipe 24L is placed behind the turbine unit 232 of the left turbocharger 23L (see FIG. 5).

In the crankshaft direction, a turbocharger intake outlet 233 (see FIG. 5) which is an intake outlet possessed by each of the turbochargers 23R and 23L is placed in the position same as at least part of the intercooler 25. The turbocharger intake outlet 233 is an intake outlet possessed by each of the turbochargers 23R and 23L. The turbocharger intake outlet 233 is, in detail, an intake outlet of the compressor unit 231 of each of the turbochargers 23R and 23L. The turbocharger intake outlet 233 of the right turbocharger 23R is placed on the left lateral face of the compressor unit 231, and communicates to the right first intake communication pipe 28R connected with the intercooler 25. The turbocharger intake outlet 233 of the left turbocharger 23L is placed on the right lateral face of the compressor unit 231, and communicates to the left first intake communication pipe 28L connected with the intercooler 25.

The turbocharger intake outlets 233 respectively possessed by the two turbochargers 23R and 23L, in the crankshaft direction, are placed in the same position as at least part of the intercooler 25; thus, lengths of the two first intake communication pipes 28R and 28L can be shortened. Intake air can be efficiently led from each of the turbochargers 23R and 23L to the intercooler 25.

The intercooler 25, which is connected to turbocharger 23, is shared by the two cylinder rows 111R and 111L. The number of parts of the engine 100 can be reduced compared to a configuration of placing the intercooler for each cylinder row. This makes it possible to reduce the cost of the engine 100. Further, this makes it possible to downsize the engine 100. Also, the intercooler 25 is supplied with intake air from the two turbochargers 23R and 23L. However, it may be so configured that the number of turbochargers provided in the engine is one, with the two cylinder rows sharing the one turbocharger.

Figure 9:
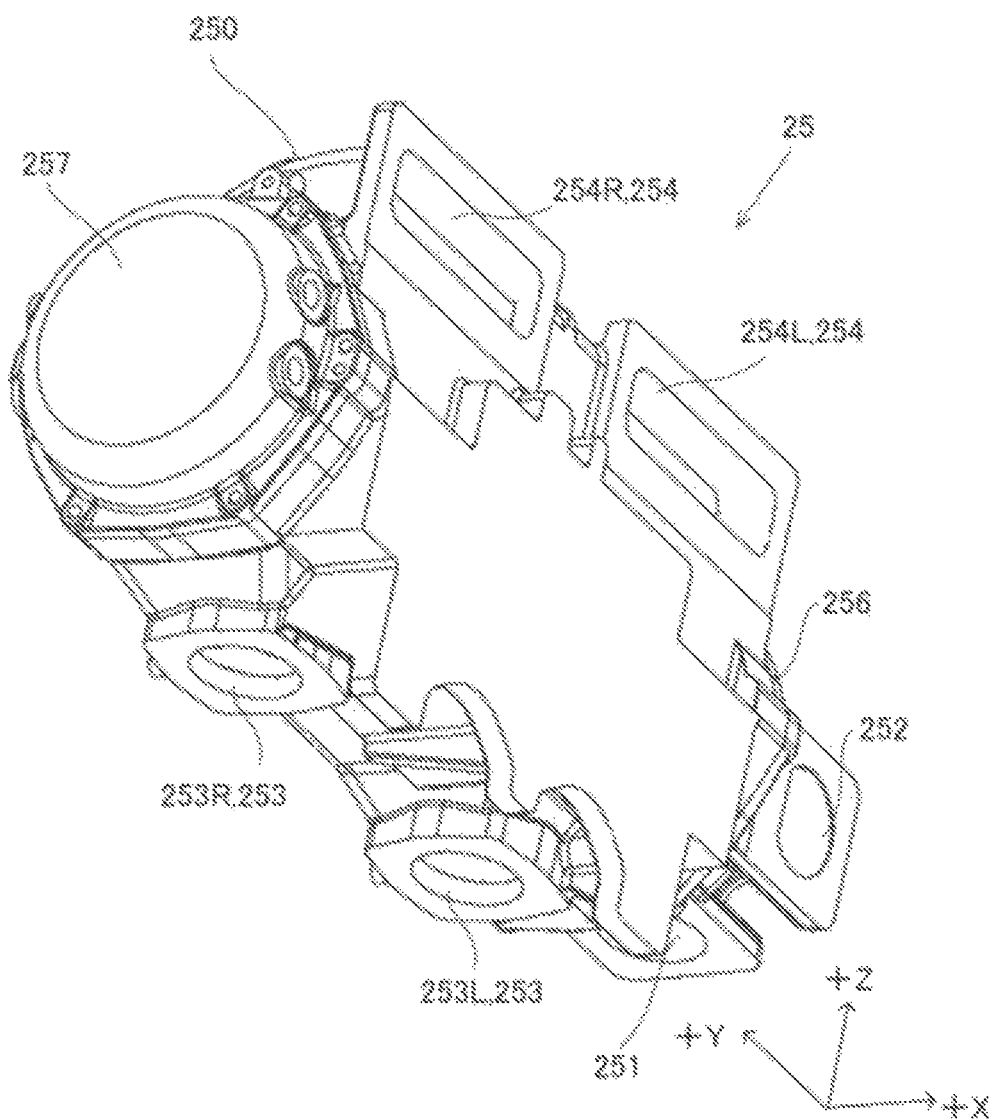
FIG. 9 is a schematic perspective view of an intercooler provided in the engine.

FIG. 9 is a schematic perspective view of the intercooler 25 provided in the engine 100 according to the embodiment of the present invention. FIG. 9 shows the intercooler 25 viewed from the right diagonally downward. The intercooler 25 is a liquid-cool intercooler, and has a cool liquid inlet 251 which is an inlet of the cool liquid, and a cool liquid outlet 252 which is an outlet of the cool liquid. The cool liquid that enters the inner portion from the cool liquid inlet 251 passes through a heat exchange unit (not shown) provided inside, and is discharged from the cool liquid outlet 252. In the present embodiment, the cool liquid is cool water. However, the cool liquid may be a liquid other than water, such as antifreeze, for example. Antifreeze is, for example, a liquid mixture of pure water and ethylene glycol in a given ratio.

Further, the intercooler 25 has an intercooler intake inlet 253, which is an inlet for intake air. In detail, the intercooler intake inlet 253 includes a right intercooler intake inlet 253R that communicates with the right first intake communication pipe 28R and a left intercooler intake inlet 253L that communicates with the left first intake communication pipe 28L. The right intercooler intake inlet 253R is placed on the right side of the underside of the intercooler 25. The left intercooler intake inlet 253L is placed on the left side of the underside of the intercooler 25.

The intercooler intake inlet 253, which is the intake inlet of the intercooler, is placed above the turbocharger intake outlet 233, which is an intake outlet possessed by each of the turbochargers 23R and 23L. As shown in FIG. 5, the right first intake communication pipe 28R, which connects the turbocharger intake outlet 233 portion of the right turbocharger 23R with the right intercooler intake inlet 253R portion, has a curved shape. In detail, the right first intake communication pipe 28R has a curved portion that tends upward as extending leftward. The left first intake communication pipe 28L, which connects the turbocharger intake outlet 233 portion of the left turbocharger 23L with the left intercooler intake inlet 253L portion, has a curved shape. In detail, the left first intake communication pipe 28L has a curved portion that tends upward as extending rightward. Creating the above configuration makes it easier to absorb an assembly tolerance in the crankshaft direction, making it possible to improve the assembling property of the engine 100.

Returning to FIG. 9, the intercooler 25 has an intercooler intake outlet 254 that, to the outer portion of intercooler 25, discharges the intake air having entered the inner portion from the intercooler intake inlet 253. The intake air entering the intercooler 25 from the intercooler intake inlet 253 exchanges heat with the heat exchange unit provided inside and is discharged from the intercooler intake outlet 254 to the outside of the intercooler 25.

In detail, the intercooler intake outlet 254 includes a right intercooler intake outlet 254R placed on the right side above the front of intercooler 25 and a left intercooler intake outlet 254L placed on the left side above the front of intercooler 25. That is, on the side where the intra-bank area 200 in the crankshaft direction is present, the intercooler 25 has the intercooler intake outlets 254R and 254L that discharges, to the outside, the intake air supplied from each of the two turbochargers 23 and entered inside. Further, the right intercooler intake outlet 254R and the left intercooler intake outlet 254L are symmetrically placed with respect to the center surface S (see FIG. 6, etc.).

Figure 10:
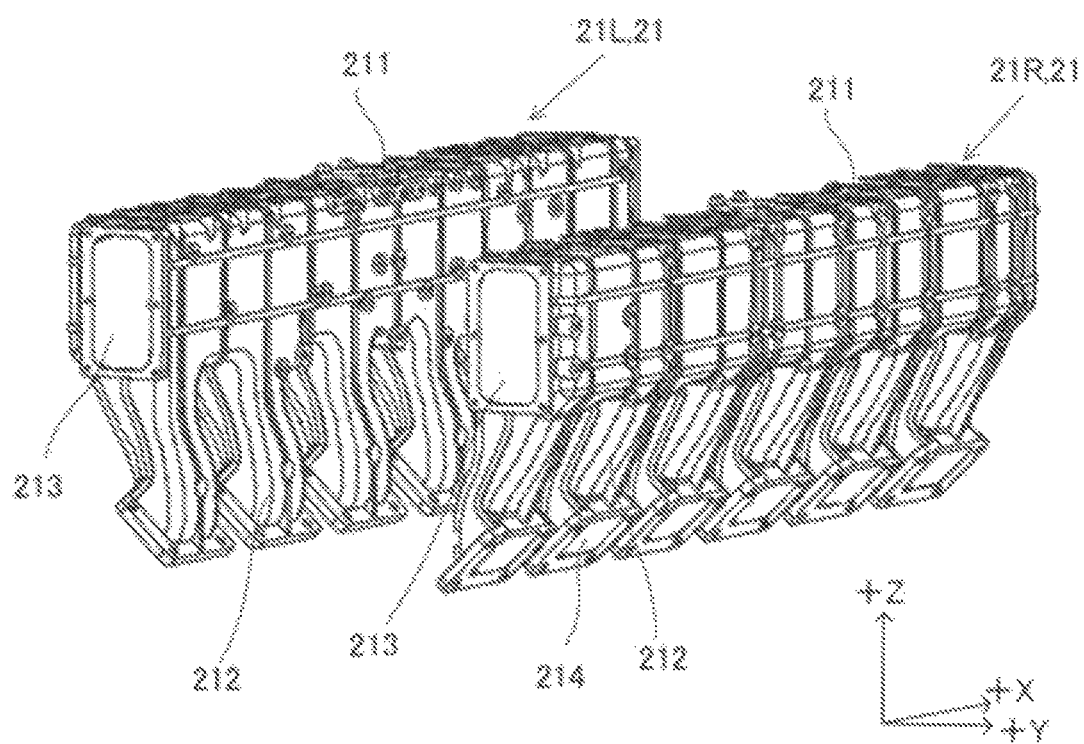
FIG. 10 is a schematic perspective view showing two intake manifolds provided in the engine.

FIG. 10 is a schematic perspective view showing the two intake manifolds 21R and 21L provided in the engine 100 according to the embodiment of the present invention. As shown in FIG. 10, each of the intake manifolds 21R, 21L has a rectangular intake manifold body 211, and a multiplicity of intake air distribution pipes 212 extending downward from the intake manifold body 211.

On the rear side of the intake manifold body 211, there is provided the intake manifold intake inlet 213 which is the inlet for intake air. At the lower end portion of each of the intake air distribution pipes 212, there is provided an intake manifold intake outlet 214 that communicates to the intake port 41 (see FIG. 2) provided in the head block 4. In the present embodiment, the number of cylinders on right and left is six each, and the number of intake air distribution pipes 212 provided for the right intake manifold 21R and the left intake manifold 21L is six each.

Further, the right intake manifold 21R and the left intake manifold 21L are placed substantially symmetrically with respect to the center surface S. The right intake manifold 21R and the left intake manifold 21L have the same height position in the up and down direction. The right intake manifold 21R and the left intake manifold 21L are slightly offset from each other in the front and back direction. In detail, the left intake manifold 21L is positioned slightly more forward than the right intake manifold 21R (see FIG. 7).

It is preferable that the intake manifold 21 provided in the engine 100 is at least partly placed in the intra-bank area 200. It is preferable that the two intake manifolds 21R and 21L provided for the two cylinder rows, respectively 111R and 111L are at least partly placed in the intra-bank area 200. In the present embodiment, each of the two intake manifolds 21R and 21L is partly placed in the intra-bank area 200. In detail, a portion of the intake air distribution pipe 212 is placed in the intra-bank area 200, and the intake manifold body 211 is placed above the intra-bank area 200.

The intake manifold 21 is connected to the intake air's outlet portion possessed by the intercooler 25 (intercooler intake outlet 254 portion). In detail, the right intercooler intake outlet 254R portion and the intake manifold intake inlet 213 portion of the right intake manifold 21R are connected by the right second intake communication pipe 30R (see FIG. 7, etc.). That is, the right intercooler intake outlet 254R and the intake manifold intake inlet 213 of the right intake manifold 21R are connected via the right second intake communication pipe 30R. The left intercooler intake outlet 254L portion and the intake manifold intake inlet 213 portion of the left intake manifold 21L are connected by the left second intake communication pipe 30L (see FIG. 7, etc.). That is, the left intercooler intake outlet 254L and the intake manifold intake inlet 213 of the left intake manifold 21L communicate via the left second intake communication pipe 30L.

The intake air entering the intercooler 25 from the turbocharger 23 moves from the intercooler intake outlet 254 via the second intake communication pipe 30 to the intake manifold intake inlet 213 placed above the intra-bank area 200. The intake air entering the intake manifold body 211 from the intake manifold air inlet 213 is distributed to each intake port 41 by a multiplicity of intake air distribution pipes 212 and is supplied to each combustion chamber. The intercooler intake outlet 254 is provided on the intercooler 25's side where the intra-bank area 200 in the crankshaft direction is present, thus making it possible to lead the intake air by a short distance from the intercooler 25 to the intake manifold 21. That is, the engine 100 of the present embodiment makes it possible to lead the intake air by a short distance from the turbocharger 23 to the intake manifold 21.

The intake inlet (intercooler intake inlet 253) of the intercooler 25 is placed at a lower portion of the intercooler 25. The intake outlet (intercooler intake outlet 254) of the intercooler 25 is placed at an upper portion of the intercooler 25. In the present embodiment, the intake manifold 21 is placed inside the V-bank which includes the right bank RB and left bank LB, and the exhaust manifold 22 is placed outside the V-bank. In the above configuration, the intake manifold 21, where the intake air enters from the intercooler 25, is placed higher than the exhaust manifold 22. Due to this, providing an intake inlet 253 at the lower portion of the intercooler 25 and providing the intake outlet 254 at the upper portion of the intercooler 25 can configure the intake air flow path without difficulty. That is, the engine 100 can be easily made compact.

<3. Details of Intercooler>

Figure 11:
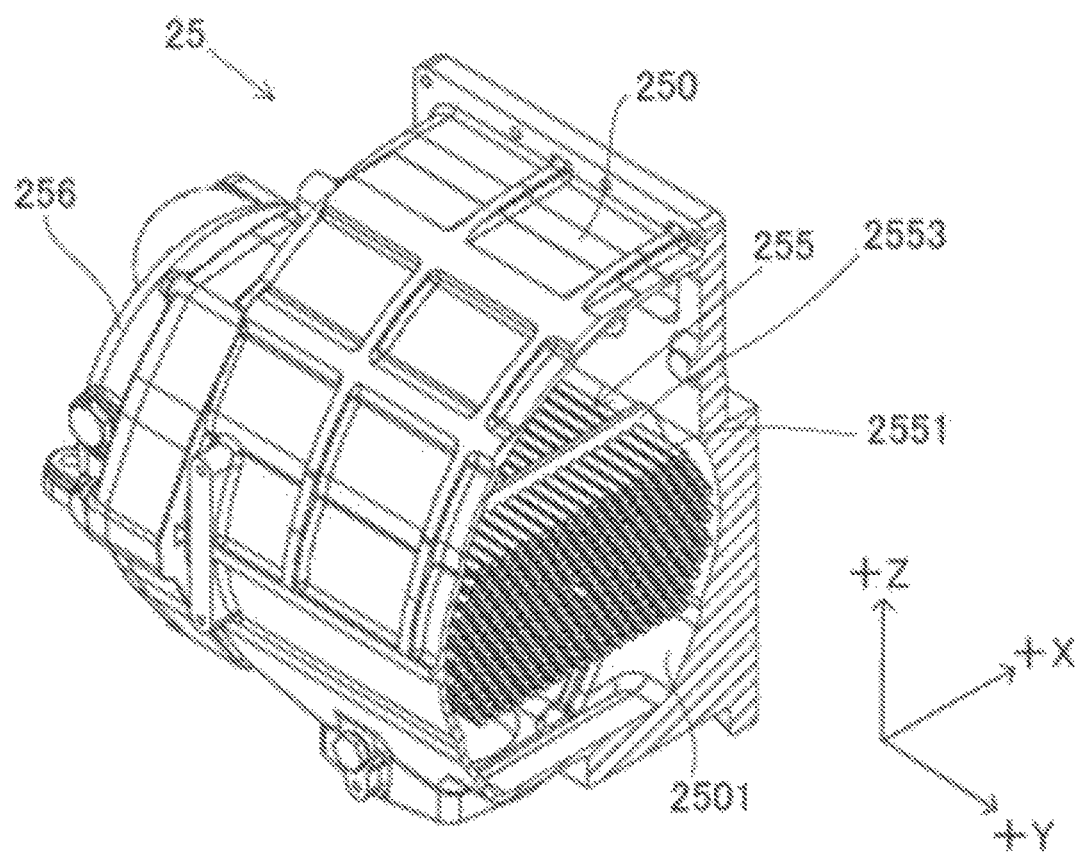
FIG. 11 is a first cross-sectional perspective view showing the schematic configuration of the intercooler provided in the engine.
Figure 12:
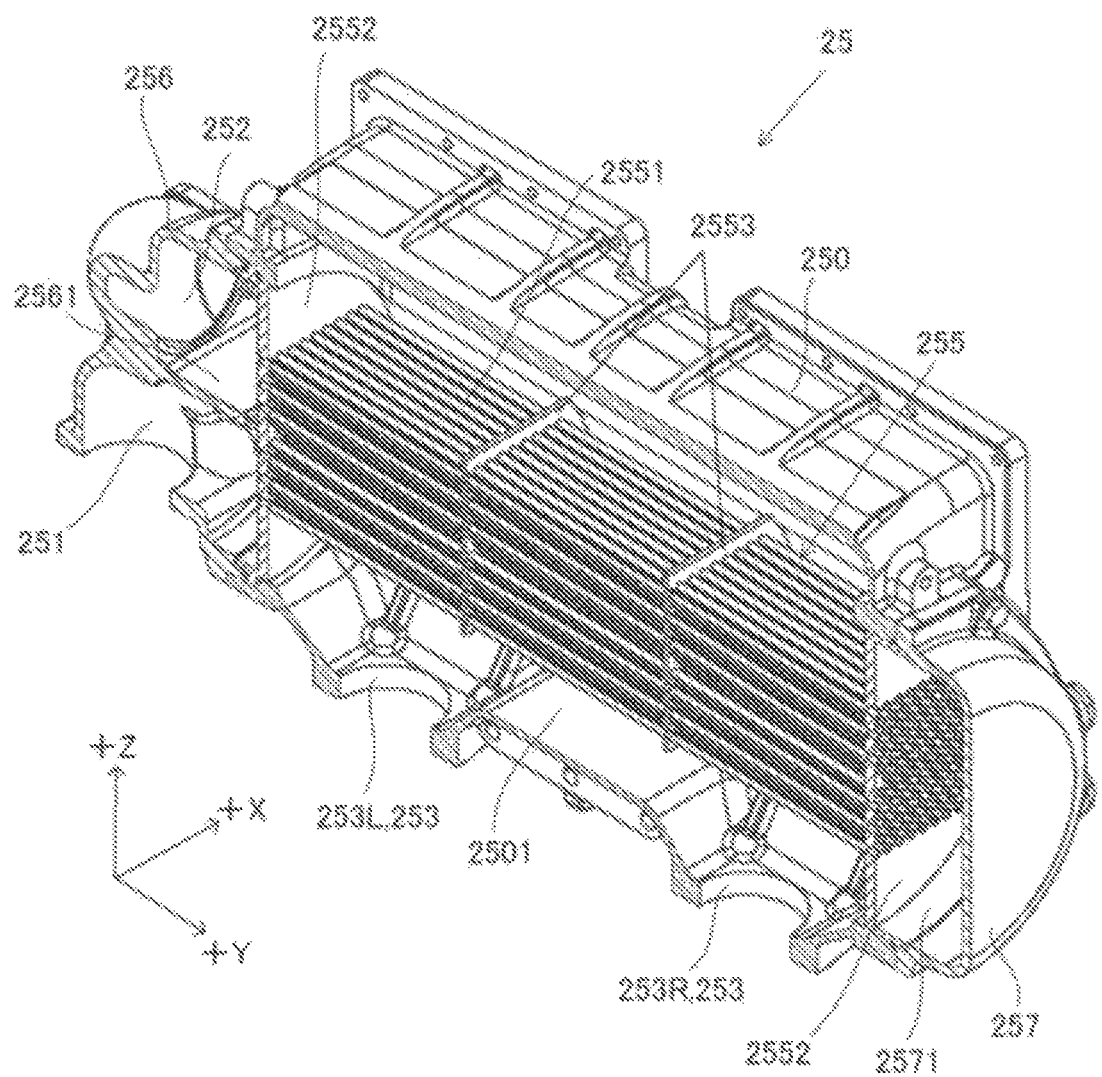
FIG. 12 is a second cross-sectional perspective view showing the schematic configuration of the intercooler provided in the engine.

FIG. 11 is a first cross-sectional view showing the schematic configuration of the intercooler 25 provided in the engine 100 according to the embodiment of the present invention. FIG. 12 is a second cross-sectional view showing the schematic configuration of the intercooler 25 provided in the engine 100 according to the embodiment of the present invention. The first and second cross sections are cross sections cut at different positions. FIG. 11 shows a cross-section cut along a plane orthogonal to the right and left direction. FIG. 12 shows a cross-section cut along a plane orthogonal to the front and back direction.

As shown in FIGS. 9, 11, and 12, the intercooler 25 has an intercooler body unit 250, a heat exchange unit 255, a first intercooler lid unit 256, and a second intercooler lid unit 257.

The intercooler body unit 250 is cylindrical in shape, extending in the right and left direction. An intercooler intake inlet 253 is provided on the underside of the intercooler body unit 250. In detail, the right intercooler intake inlet 253R is provided on the right side of the lower face of the intercooler body unit 250 and the left intercooler intake inlet 253L is provided on the left side of the lower face. Further, an intercooler intake outlet 254 is provided above the front face of the intercooler body unit 250. In detail, the right intercooler intake outlet 254R is provided on the right side above the front face of the intercooler body unit 250, and the left intercooler intake outlet 254L is provided on the left side above the front face.

The heat exchange unit 255 is placed in the intercooler body unit 250. The heat exchange unit 255 has inside where multiple pipes 2551 through which the cool liquid flows. The multiple pipes 2551 extends in the right and left direction. At the right and left end portions of the multiple pipes 2551, there is placed a pair of end portion holding portions 2552 to hold the multiple pipes 2551 together. The multiple pipes 2551, in a state of the right and left end faces opened, are held in the pair of end portion holding portions 2552. The multiple pipes 2551 are bundled together by being held by a pair of end portion holding portions 2552. The area occupied by the bundled multiple pipes 2551 extends in the in-plane direction which is parallel to the up and down and front and back directions. The bundled multiple pipes 2551 expand from the front end to the rear end of the inner space 2501 of the intercooler body unit 250 (see FIG. 11).

Each of the pair of end portion holding portions 2552 is provided in the form of a plate. Of the pair of end portion holding portions 2552, the end portion holding portion 2552 placed on the right side blocks the right end face of the intercooler body unit 250. Further, of the pair of end portion holding portions 2552, the end portion holding portion 2552 placed on the left side blocks the left end face of the intercooler body unit 250. The multiple pipes 2551 extend from the left end portion to the right end portion of the intercooler body unit 250.

In the present embodiment, the middle support unit 2553, which supports the middle portion of the multiple pipes 2551 in the right and left direction, is placed in the inner space 2501 of the intercooler body unit 250. The middle support unit 2553 is plate-shaped, and contacts the intercooler body unit 250. The multiple pipes 2551 penetrate the middle support unit 2553. In the present embodiment, the middle support units 2553 two in number are so provided as to be spaced apart in the right and left direction. However, the number of middle support units 2553 may be changed as needed. As the case may be, the middle support unit 2553 may be omitted.

The first intercooler lid unit 256 is placed on the left side of the intercooler body unit 250, and, from the left, covers the end portion holding portion 2552 which is of the pair of end portion holding portions 2552 and which is placed on the left side. The first intercooler lid unit 256 has inside having a bulkhead unit 2561 that divides the inner space into upper and lower.

The space below the bulkhead unit 2561 constitutes the above cool liquid inlet 251. The cool liquid inlet 251 faces the left end face of part of the multiple pipes 2551. For example, the pipe 2551's left end face placed in the lower half of the multiple pipes 2551 faces the cool liquid inlet 251.

The space above the bulkhead unit 2561 constitutes the above cool liquid outlet 252. The cool liquid outlet 252 faces the left end face of the remaining pipe 2551 that is of the multiple pipes 2551, and that is other than part of the pipes 2551 facing the cool liquid inlet 251. For example, the pipe 2551's left end face placed in the upper half of the multiple pipes 2551 faces the cool liquid outlet 252.

The second intercooler lid unit 257 is placed on the right side of the intercooler body unit 250, and, from the right, covers the end portion holding portion 2552 which is of the pair of end portion holding portions 2552 and which is placed on the right side. The second intercooler lid unit 257 is of a cup-shape open to the left. The right end faces of all of the multiple pipes 2551 face the inner space of the second intercooler lid unit 257 mounted to the intercooler body unit 250. Hereafter, this inner space, due to a function thereof, is to be described as a turn back unit 2571. Details of the turn back unit 2571 are described below.

Figure 13:
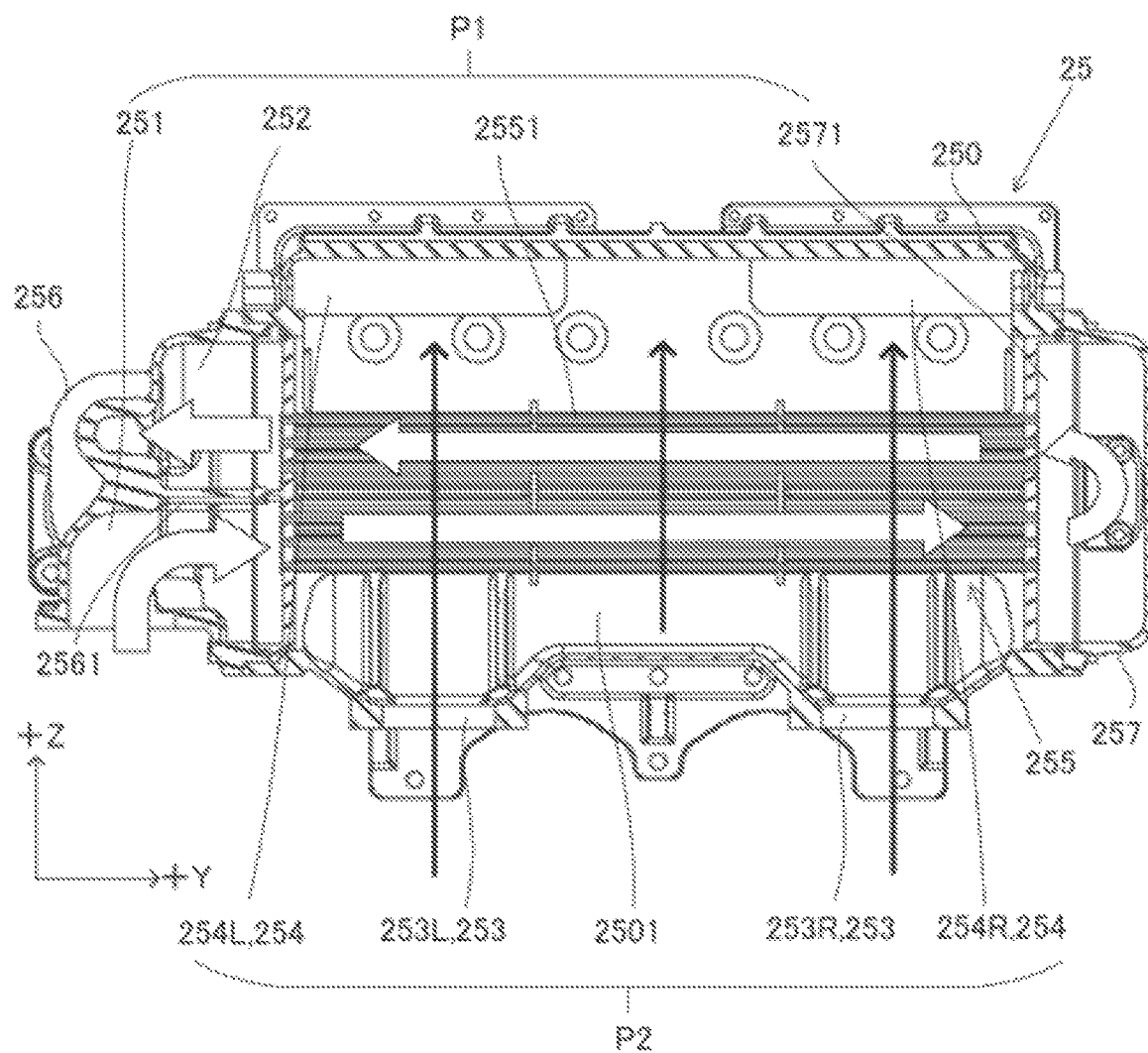
FIG. 13 is a diagram for Illustration of the flow of cool liquid and intake air in the intercooler provided in the engine.

FIG. 13 is a diagram for illustration of the flow of cool liquid and intake air in the intercooler 25 provided in the engine 100 according to the embodiment of the present invention. FIG. 13 shows the same cross section as in FIG. 12, viewed from the rear toward the front. In FIG. 13, a white arrow shows the flow of the cool liquid. In FIG. 13, a thick arrow shows the intake air flow from the turbocharger 23. The intercooler 25 has a cool liquid flow path P1 through which the cool liquid flows and an intake air flow path P2 through which the intake air from the turbocharger 23 flows.

In detail, the cool liquid flow path P1 has a cool liquid inlet (cool liquid inlet 251) and outlet (cool liquid outlet 252) on one side in a first direction along which the cool liquid flows. This configuration allows the cool liquid, inside the intercooler 25, to come and go at least once in the first direction. As a result, it is possible to suppress a difference in temperature of the intake air that passes through in the intercooler 25 and is distributed separately to the two cylinder rows 111R and 111L. Details of this respect are described below.

Further, the first direction along the flow of the cool liquid is, in detail, the direction along the main flow of the cool liquid, and is the right and left direction in the present embodiment. In the present embodiment, one side in the first direction is the left side and the other side is the right side.

In the present embodiment, the cool liquid entering from the cool liquid inlet 251 passes via the turn back unit 2571, which is placed on the other side in the first direction, to the cool liquid outlet 252. In detail, the cool liquid entering from the cool liquid inlet 251 flows rightward through in the multiple pipes 2551, which face the cool liquid inlet 251, to the turn back unit 2571. The cool liquid reaching the turn back unit 2571 flows leftward through in the multiple pipes 2551, which face the cool liquid outlet 252, to the cool liquid outlet 252, and is discharged to the outside of the intercooler 25. That is, in the present embodiment; inside the intercooler 25, the cool liquid comes and goes only once in the right and left direction (first direction). Creating the above configuration suppresses the inner portion of the intercooler 25 from becoming complicated.

As can be seen from the above, in the present embodiment, the cool liquid flow path P1 is composed of the cool liquid inlet 251, the multiple pipes 2551, the turn back unit 2571, and the cool liquid outlet 252.

Further, the intake air flow path P2 has an intake inlet (intercooler intake inlet 253) on one side in a second direction along the intake air flow from the turbocharger 23, and an intake outlet (intercooler intake outlet 254) on the other side. With the above configuration, the intake inlet and the intake outlet are on opposite sides, making it easier to distribute the intake system's parts to be placed around the intercooler 25.

Further, the second direction along the flow of the intake air is, in detail, the direction along the main flow of the intake air, and, in the present embodiment, is the up and down direction. In the present embodiment, one side in the second direction is the down side, and the other side is the up side.

In the present embodiment, the intake air flow path P2 is so configured that the intake air passes once through one side and the other side in the second direction. In detail, the intake air entering the inner space 2501 of the intercooler body unit 250 from the right intercooler intake inlet 253R and the left intercooler intake inlet 253L exits from the down side of the heat exchange unit 255 through the gap between the multiple pipes 2551 to the up side of the heat exchange unit 255. As passing through the gap between the multiple pipes 2551, the intake air is cooled by heat loss. The cool liquid flowing inside the multiple pipes 2551 is heated by taking heat from the intake air. The intake air exiting to the up side of the heat exchange unit 255 enters the right intake manifold 21R via the right intercooler intake outlet 254R, and enters the left intake manifold 21L via the left intercooler intake outlet 254L. This one-way flow of the intake air from downward to upward suppresses the inner portion of the intercooler 25 from becoming complicated.

As can be seen from the above, in the present embodiment, the intake air flow path P2 is composed of the intercooler intake inlet 253, the inner space 2501 of the intercooler body unit 250, and the intercooler intake outlet 254.

In the intercooler 25 of the present embodiment, the first and second directions intersect. In detail, the two flows intersect because the cool liquid flows in the right and left direction and the intake air flows in the up and down direction. With the above configuration, is can be so configured that the intake air from the turbocharger 23 always passes through the heat exchange unit 255 which is configured by using the cool liquid flow path P1. As the case may be, the first and second directions may be the same direction.

The intake air entering the intercooler body unit 250 from the right intercooler intake inlet 253R enters the right intake manifold 21R mainly via the right intercooler intake outlet 254R. Further, the intake air entering the intercooler body unit 250 from the left intercooler intake inlet 253L enters the left intake manifold 21L mainly through the left intercooler intake outlet 254L. The cool liquid flowing in the cool liquid flow path P1 is increased in temperature as moving from upstream (cool liquid inlet 251) toward downstream (cool liquid outlet 252). Due to this, the intake air entering the left intake manifold 21L will mainly pass through the low-temperature and high-temperature portions of the cool liquid, while the intake air entering the right intake manifold 21R will mainly pass through the mid-temperature portion where the cool liquid temperature is between the above high and low temperature portions. As a result, the heat energy deprived by the cool liquid is substantially the same between the intake air sent to the right intake manifold 21R which is connected to the right cylinder row 111R, and the intake air sent to the left intake manifold 21L which is connected to the left cylinder row 111L. That is, it is possible to suppress, between the right cylinder row 111R and the left cylinder row 111L, the difference in the intake air's temperature adjusted by the intercooler 25.

Further, the inner space 2501 of the intercooler body unit 250 may be divided into a right chamber and a left chamber by placing a bulkhead in the intercooler body unit 250. With the above, all of the intake air entering the intercooler body unit 250 from the right intercooler intake inlet 253R can be led to the right intercooler intake outlet 254R. Further, all of the intake air entering the intercooler body unit 250 from the left intercooler intake inlet 253L can be led to the left intercooler intake outlet 254L. With the above, it is easier to stabilize the temperature of the intake air sent to the respective intake manifolds 21 on the right and left.

Further, the heat exchange unit 255 which is of the intercooler 25 and which is configured using the cool liquid flow path P1 is so configured as to be provided with a multi-pipe cooling structure having the multiple pipes 2551 extending in the first direction. The above configuration can acquire a high cooling efficiency. However, the heat exchange unit provided in the intercooler 25 may be configured with a structure other than the multi-pipe cooling structure.

Figure 14:
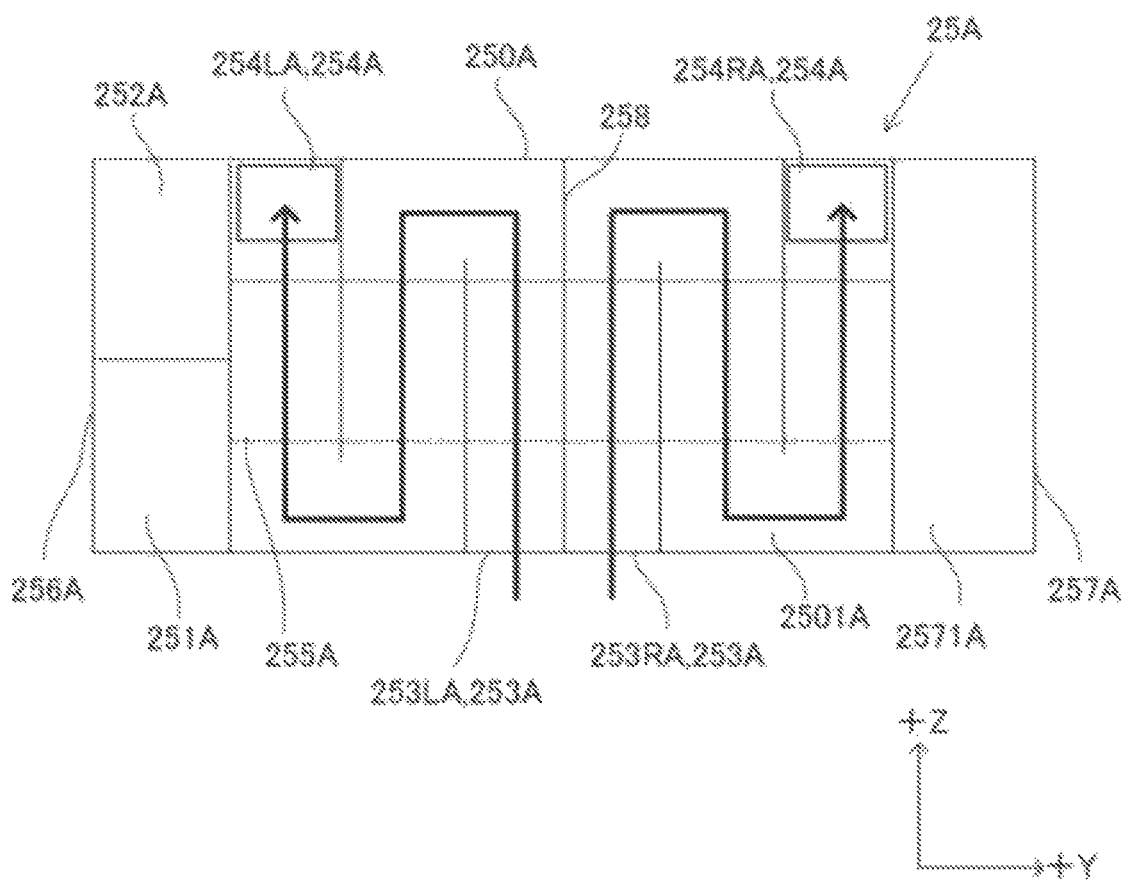
FIG. 14 is a schematic view showing the configuration of the intercooler according to a modified example.

Further, in the present embodiment, the intake air flow path P2 is so configured that the intake air passes once through one side (down side) and the other side (up side) in the second direction (up and down direction), but may have a configuration different from this. FIG. 14 shows a schematic view of an intercooler 25A according to a modified example.

The intercooler 25A according to the modified example, as in the embodiment described above, also has an intercooler body unit 250A, a heat exchange unit 255A, a first intercooler lid unit 256A, and a second intercooler lid unit 257A. The intercooler body unit 250A has right and left intercooler intake inlets 253A and right and left intercooler intake outlets 254A. The first intercooler lid unit 256A has a cool liquid inlet 251A and a cool liquid outlet 252A. The second intercooler lid unit 257A has a turn back unit 2571A. In FIG. 14, the thick arrow indicates intake air flow.

As shown in FIG. 14, it may be so configured that the intake air entering the intercooler body unit 250 from the intercooler intake inlet 253A, after reaching the other side from one side in the second direction, turns back toward one side and further turns back toward the other side at least once, followed by exiting from the intercooler intake outlet 254A.

Further, in the example shown in FIG. 14, the number of intake air's turn backs in the second direction is two, but may be an even number of turn backs greater than two. In the embodiment described above, the number of intake air's turn backs is zero.

In the example shown in FIG. 14; in the intercooler body unit 250A, there is provided a bulkhead 258 that divides the inner space 2501A into a left chamber and a right chamber. That is, the intake air entering the intercooler body unit 250A from the right intercooler intake inlet 253RA is led to the right intercooler intake outlet 254RA. Further, the intake air entering the intercooler body unit 250A from the left intercooler intake inlet 253LA is led to the left intercooler intake outlet 254LA.

<4. Notes, Etc.>

The various technical features disclosed in the present specification can be modified in various ways without departing from the gist of the technical creation thereof. That is, the above embodiments should be considered exemplary in all respects and not restrictive. Further, the multiple embodiments and modified examples shown in the present specification may be combined to the extent possible.

REFERENCE SIGNS LIST

6: crankshaft
21: intake manifold
21L: left intake manifold
21R: right intake manifold
22: exhaust manifold
22L: left exhaust manifold
22R: right exhaust manifold
23: turbocharger
23L: left turbocharger
23R: right turbocharger
25, 25A: intercooler
100: engine
111: cylinder row
111L: left cylinder row
111R: right cylinder row
200: intra-bank area
233: turbocharger intake outlet
251, 251A: cool liquid inlet (inlet of cool liquid)
252, 252A: cool liquid outlet (outlet of cool liquid)
253, 253A: intercooler intake inlet (inlet of intake air)
253L, 253LA: left intercooler intake inlet
253R, 253RA: right intercooler intake inlet
254, 254A: intercooler intake outlet (outlet of intake air)
254L, 254LA: left intercooler intake outlet
254R, 254RA: right intercooler intake outlet
255, 255A: heat exchange unit
2551: pipe
2571, 2571A: turn back unit
ER: extended region
P1: cool liquid flow path
P2: intake air flow path

The invention claimed is:

1. An engine comprising:
two cylinder rows arranged to be aligned side by side;
a turbocharger; and
an intercooler shared by the two cylinder rows, and connected to the turbocharger,
wherein the intercooler has:
a cool liquid flow path through which a cool liquid is configured to flow, and
an intake air flow path through which intake air from the turbocharger is configured to flow,
the cool liquid flow path has an inlet and outlet on a first side of the intercooler in a first direction along the cool liquid flow path of the cool liquid,
the intake air flow path has an inlet on a second side of the intercooler in a second direction along the intake air flow path, and an outlet on a third side of the intercooler that is opposite the second side,
the inlet of the intake air flow path is placed at a lower portion of the intercooler, and
the outlet of the intake air flow path is placed at an upper portion of the intercooler.

2. The engine as claimed in claim 1, wherein the cool liquid entering from the inlet of the cool liquid flow path passes via a turn back unit to the outlet of the cool liquid flow path, wherein the turn back unit is placed on a fourth side of the intercooler in the first direction.

3. The engine as claimed in claim 1, wherein the intake air flow path is so configured that the intake air passes once through the second side and the third side in the second direction.

4. The engine as claimed in claim 1, wherein the intake air flow path is so configured that the intake air, after reaching the third side from the second side in the second direction, turns back toward the second side in the second direction, and further turns back toward the third side in the second direction at least once.

5. The engine as claimed in claim 1, wherein the first direction and the second direction intersect.

6. The engine as claimed in claim 1, wherein:
the turbocharger includes two turbochargers, each turbocharger of the two turbochargers is provided for a corresponding row of the two cylinder rows, and
the intercooler is configured to be supplied with the intake air from the two turbochargers.

7. The engine as claimed in claim 1, including:
an intake manifold placed at least partly in an intra-bank area positioned between the two cylinder rows, and connected to the outlet of the intake air flow path, and
an exhaust manifold placed on a side of a cylinder row of the tow cylinder row that is opposite to the intra-bank area.

8. The engine as claimed in claim 1, wherein the intercooler includes a heat exchange unit that is provided with a multi-pipe cooling structure having multiple pipes, wherein the cool liquid flow path passes through the heat exchange unit.

9. The engine as claimed in claim 1, wherein:
the two cylinder rows each extend in a crankshaft direction,
the intercooler is placed at one end side of the two cylinder rows in the crankshaft direction, the engine further comprising:
two turbochargers provided for the two cylinder rows, respectively, and connected to the intercooler, and
two exhaust manifolds provided for the two cylinder rows, respectively, wherein a first exhaust manifold of the two exhaust manifolds is placed on a side of a first cylinder row of the two cylinder rows that is opposite of an intra-bank area positioned between the tow cylinder rows, and wherein a second exhaust manifold of the two exhaust manifolds is placed on a side of a second cylinder row of the two cylinder rows that is opposite of the intra-bank area, and
wherein each of the two turbochargers is placed at least partly on an extended region on one side in the crankshaft direction of the corresponding one of the exhaust manifolds, or between the extended region and the intercooler.

10. The engine as claimed in claim 9, including:
two intake manifolds provided for the two cylinder rows, respectively, and placed at least partly in the intra-bank area.

11. The engine as claimed in claim 9, wherein, in the crankshaft direction, a turbocharger intake outlet of each of the turbochargers is placed in a position same as at least part of the intercooler.

12. The engine as claimed in claim 9, wherein an intercooler intake inlet of the intercooler is placed above a turbocharger intake outlet of each of the turbochargers.

13. The engine according to claim 9, wherein, on an intra-bank area side in the crankshaft direction, the intercooler has an intercooler intake outlet that discharges, to outside, the intake air supplied to inside the intercooler from each of the two turbochargers.

14. An engine comprising:
two cylinder rows arranged to be aligned side by side;
a turbocharger; and
an intercooler shared by the two cylinder rows, and connected to the turbocharger,
wherein the intercooler has:
a cool liquid flow path through which a cool liquid is configured to flow, and
an intake air flow path through which intake air from the turbocharger is configured to flow,
the cool liquid flow path has an inlet and outlet on a first side of the intercooler in a first direction along the cool liquid flow path of the cool liquid,
the intake air flow path has an inlet on a second side of the intercooler in a second direction along the intake air flow path of the intake air, and an outlet on a third side of the intercooler that is opposite the second side, and
the intake air flow path is so configured that the intake air, after reaching the third side from the second side in the second direction, turns back toward the second side in the second direction, and further turns back toward the third side in the second direction at least once.

15. The engine as claimed in claim 14, including:
two turbochargers provided for the two cylinder rows, respectively, and connected to the intercooler, and
two exhaust manifolds provided for the two cylinder rows, respectively, and placed on an opposite side of an intra-bank area positioned between the two cylinder rows, and
wherein each of the two turbochargers is placed at least partly on an extended region on one side in a crankshaft direction of the corresponding one of the exhaust manifolds, or between the extended region and the intercooler.

16. An engine comprising:
two cylinder rows arranged to be aligned side by side;
two exhaust manifolds provided for the two cylinder rows, respectively, wherein a first exhaust manifold of the two exhaust manifolds is placed on a side of a first cylinder row of the two cylinder rows that is opposite of an intra-bank area positioned between the two cylinder rows, and wherein a second exhaust manifold of the two exhaust manifolds is placed on a side of a second cylinder row of the two cylinder rows that is opposite of the intra-bank area;
two turbochargers provided for the two cylinder rows, respectively; and
an intercooler shared by the two cylinder rows, and connected to the two turbochargers, and
wherein the intercooler has:
a cool liquid flow path through which a cool liquid is configured to flow, and
an intake air flow path through which intake air from each of the two turbochargers is configured to flow,
the cool liquid flow path has an inlet and outlet on a first side of the intercooler in a first direction along the cool liquid flow path of the cool liquid,
the intake air flow path has an inlet on a second side of the intercooler in a second direction along the intake air flow path, and an outlet on a third side of the intercooler that is opposite the second side, and
each of the two turbochargers is placed at least partly on an extended region on one side, in a crankshaft direction, of the corresponding one of the exhaust manifolds, or between the extended region and the intercooler.

17. The engine as claimed in claim 16, wherein the two cylinder rows each extend in a crankshaft direction.

18. The engine as claimed in claim 17, wherein the intercooler is placed at one end side of the two cylinder rows in the crankshaft direction.

19. The engine as claimed in claim 16, wherein the intake air flow path is so configured that the intake air, after reaching the third side from the second side in the second direction, turns back toward the second side in the second direction, and further turns back toward the third side in the second direction at least once.

20. The engine as claimed in claim 16, wherein:
the inlet of the intake air flow path is placed at a lower portion of the intercooler, or
the outlet of the intake air is flow path placed at an upper portion of the intercooler.

* * * * *